(12) United States Patent
Patel et al.

(10) Patent No.: US 11,815,978 B2
(45) Date of Patent: Nov. 14, 2023

(54) DDR5 CLIENT PMIC POWER UP SEQUENCE AND STATE TRANSITIONS

(71) Applicant: Renesas Electronics America Inc., Milpitas, CA (US)

(72) Inventors: Shwetal Arvind Patel, San Jose, CA (US); Chenxiao Ren, Fremont, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 52 days.

(21) Appl. No.: 17/566,779

(22) Filed: Dec. 31, 2021

(65) Prior Publication Data

US 2022/0197366 A1 Jun. 23, 2022

Related U.S. Application Data

(63) Continuation of application No. 16/724,857, filed on Dec. 23, 2019, now Pat. No. 11,249,539.

(60) Provisional application No. 62/868,019, filed on Jun. 28, 2019.

(51) Int. Cl.
*G06F 1/32* (2019.01)
*G06F 1/3234* (2019.01)

(52) U.S. Cl.
CPC .................. *G06F 1/3275* (2013.01)

(58) Field of Classification Search
CPC .................................................. G06F 1/3275
See application file for complete search history.

(56) References Cited

U.S. PATENT DOCUMENTS

| 6,418,075 B2 * | 7/2002 | Shimano | G11C 5/147 365/189.11 |
| 8,339,891 B2 * | 12/2012 | Arntzen | G06F 1/3275 365/226 |
| 11,614,872 B2 * | 3/2023 | Rowley | G06F 1/3275 713/320 |

(Continued)

FOREIGN PATENT DOCUMENTS

WO 2016081746 A2 5/2016

OTHER PUBLICATIONS

EP Search dated May 11, 2023 received in EP Patent Application No. 22198029.5.

(Continued)

*Primary Examiner* — Zahid Choudhury
(74) *Attorney, Agent, or Firm* — SCULLY, SCOTT, MURPHY & PRESSER, P.C.

(57) ABSTRACT

An apparatus includes a plurality of registers and a host interface comprising a plurality of pins. One of the plurality of registers may be a power state entry register configured to control entry to a low power state. One of the plurality of pins may be an enable pin. The apparatus may be configured to enter the low power state in response to setting the power state entry register to a first value and providing the enable pin a signal with a first level. The apparatus may be configured to exit the low power state in response to providing the enable pin the signal with a second level. The apparatus may enter an idle state after exiting the low power state. The low power state may consume less power than the idle state. The enable pin is implemented as an input configured to control a status of a plurality of regulators.

18 Claims, 19 Drawing Sheets

(56) References Cited

U.S. PATENT DOCUMENTS

| | | | |
|---|---|---|---|
| 2001/0043493 A1* | 11/2001 | Fujioka | G11C 5/145 |
| | | | 365/189.09 |
| 2009/0080274 A1 | 3/2009 | Nakanishi | |
| 2010/0250974 A1* | 9/2010 | Ristic | G06F 1/3246 |
| | | | 713/300 |
| 2011/0296214 A1 | 12/2011 | Arntzen et al. | |
| 2016/0062448 A1* | 3/2016 | Park | G06F 11/3058 |
| | | | 713/300 |
| 2016/0070327 A1* | 3/2016 | Nemani | G06F 1/3206 |
| | | | 713/300 |
| 2016/0116956 A1* | 4/2016 | Kim | G06F 1/26 |
| | | | 713/340 |
| 2017/0185136 A1* | 6/2017 | Sundaram | G06F 13/4234 |
| 2018/0267598 A1* | 9/2018 | Pulivendula | G06F 9/4406 |
| 2019/0340142 A1* | 11/2019 | Patel | G06F 13/24 |
| 2020/0226045 A1* | 7/2020 | Le | G06F 1/30 |
| 2020/0409446 A1* | 12/2020 | Patel | G06F 1/3275 |
| 2022/0004506 A1* | 1/2022 | Connolly | G06F 21/79 |
| 2023/0092240 A1* | 3/2023 | Chauhan | H03F 3/24 |
| | | | 327/540 |

OTHER PUBLICATIONS

NXP Semicibductors, Data sheet: Advance Information, "Power management integrated circuit(PMIC) for i.MX 7 & i.MX 6SL/SX/UL", Document No. PF3000. Rev.9.0, Aug. 2017. 122 Pages.

* cited by examiner

DDR5 CLIENT PMIC POWER UP SEQUENCE AND STATE TRANSITIONS

This application relates to U.S. application Ser. No. 16/724,857, filed Dec. 23, 2019 and U.S. Provisional Application No. 62/868,019, filed Jun. 28, 2019, both of which are hereby incorporated by reference in their entirety.

FIELD OF THE INVENTION

The invention relates to computer memory generally and, more particularly, to a method and/or apparatus for implementing DDR5 client PMIC power up sequence and state transitions.

BACKGROUND

Consumers are looking to reduce power consumption of computing devices. As computing devices become more portable, power consumption becomes increasingly important to ensure a long battery life. Particularly, portable computing devices such as laptops, notebook and netbook computers have stringent current requirements in certain states. Each component of a computing device needs to be optimized to reduce power consumption.

DDR5 SODIMM/UDIMM implements various power states to minimize power consumption. Power states (or P-states) are voltage-frequency pairs that set speed and power consumption of a component. When the operating voltage is lower, the power consumption may be lower. Generally, when operating in a higher P-state, power consumption is lower.

A power management integrated circuit (PMIC) can control the power states of the DDR5 SODIMM/UDIMM. However, to keep the package size of the power management integrated circuit small, the number of pins available is limited. DDR5 Client PMIC and SODIMM/UDIMM only have one pin for controlling the power states. Conventional PMICs for DDR5 Client PMIC and SODIMM/UDIMM do not allow for a seamless transition from particular power states (i.e., a P1 state and P3a state) without requiring an additional pin.

It would be desirable to implement DDR5 client PMIC power up sequence and state transitions.

SUMMARY

The invention concerns an apparatus including a plurality of registers and a host interface comprising a plurality of pins. One of the plurality of registers may be a power state entry register configured to control entry to a low power state. One of the plurality of pins may be an enable pin. The apparatus may be configured to enter the low power state in response to setting the power state entry register to a first value and providing the enable pin a signal with a first level. The apparatus may be configured to exit the low power state in response to providing the enable pin the signal with a second level. The apparatus may enter an idle state after exiting the low power state. The low power state may consume less power than the idle state. The enable pin is implemented as an input configured to control a status of a plurality of regulators.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
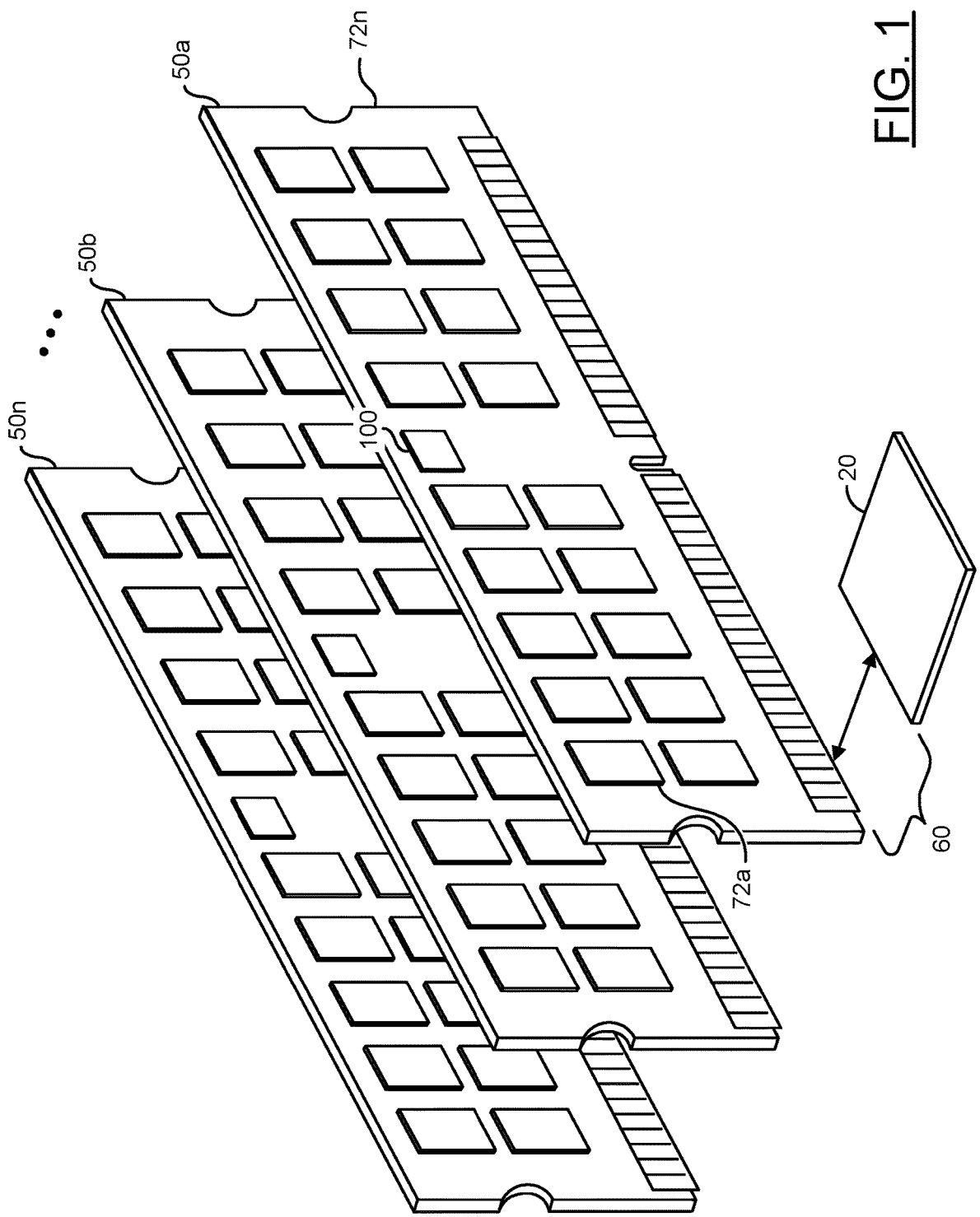
FIG. 1 is a diagram illustrating an example embodiment of an unbuffered memory module.

Embodiments of the present invention include providing DDR5 client PMIC power up sequence and state transitions that may (i) transition seamlessly from a low power P1 state to an idle P3a state, (ii) utilize existing pins for a PMIC circuit, (iii) control entry to and exit from a low power state using a VR_EN pin and a register, (iv) support a secure mode and programmable mode of operation, (v) support bi-directional PWR_GOOD pin or output only PWR_GOOD pin, (vi) support VR Disable command either with VR_EN pin or VR Disable command on the I2C/I3C bus, (vii) be implemented as part of a DDR5 unbuffered memory module, (viii) be implemented as a buffered memory module, (ix) be implemented as part of a registered double data-rate fifth generation memory module and/or (x) be implemented as one or more integrated circuits.

Embodiments of the present invention may be configured to be implemented in double data-rate fifth generation (DDR5) random access memory (RAM) modules. Low-powered hardware and/or hardware for mobile devices may have limited power budgets. Power states (e.g., P-states) may be implemented to limit power consumption under particular operating conditions. Embodiments of the present invention may be configured to control power states (e.g., entrance and exit) of the DDR5 memory and operate according to the stringent current requirements of various P-States.

Embodiments of the present invention may be configured to enable a seamless transition from a P1 state to a P3a state. Transitioning between P-states may reduce power consumption (e.g., to help meet notebook computer power requirements). In an example, a quiescent power state (e.g., P-state P1) may have a current requirement of approximately 25 uA and an idle state (e.g., P-state P3a) may have a current requirement of approximately 100 uA. Embodiments of the present invention may be configured to utilize a pre-existing pin (e.g., a pin that already has existing functionality) to transition between the P1 state and the P3a state. Re-using a pin may ensure that the present invention may be capable of meeting package size requirements and/or reducing layout complexity. Only one pin (e.g., a VR_EN pin) may be available for controlling the power states. In an example, output rails may be turned on either via the VR_EN pin or a VR Enable command on an I²C/I3C bus.

In one example, embodiments of the present invention may be implemented in unbuffered dual inline memory modules (UDIMM). For example, for a notebook computer, embodiments of the present invention may be implemented in small outline dual in-line memory modules (SODIMM). In an example, DDR5 SODIMM may comprise one pin (e.g., VR_EN) for controlling power states. In another example, embodiments of the present invention may be implemented in registered dual inline memory modules (RDIMM). The type of memory modules implemented may be varied according to the design criteria of a particular implementation.

Embodiments of the present invention may be configured to support a secure mode and/or a programmable mode of operation. Embodiments of the present invention may support bi-directional operation on a pin (e.g., PWR_GOOD) and/or output only operation on the PWR_GOOD pin. Embodiments of the present invention may be configured to support a VR Disable command using the VR_EN pin and/or a VR Disable command on an I2C/I3C bus.

Referring to FIG. 1, a diagram illustrating an example embodiment of an unbuffered memory module is shown. In various embodiments, the memory system includes a number of circuits 50a-50n. The circuits 50a-50n may be implemented as memory modules (or boards). In an example, the circuits 50a-50n may be implemented as dual in-line memory modules (DIMMs). In some embodiments, the circuits 50a-50n may be implemented as double data rate fifth generation (DDR5) SDRAM modules.

In various embodiments, the circuits 50a-50n may comprise a number of blocks (or circuits) 72a-72n, a block (or circuit) 100 and/or various other blocks, circuits, pins, connectors and/or traces. The circuits 72a-72n may implement memory devices. In an example, the circuits 72a-72n may be implemented as synchronous dynamic random-access memory (SDRAM) devices (or chips, or modules). The circuit 100 may be implemented as a power management integrated circuit (PMIC). In an example, the PMIC 100 may be compliant with the JEDEC DDR5 specification. The type, arrangement and/or number of components of the memory modules 50a-50n may be varied to meet the design criteria of a particular implementation.

The memory modules 50a-50n are shown connected to a block (or circuit) 20. The circuit 20 may implement a memory controller (e.g., a host controller). The circuit 20 may be located in another device, such as a computing engine. Various connectors (or pins or traces) 60 may be implemented to connect the memory modules 50a-50n to the memory controller 20. In some embodiments, the connectors (or pins or traces) 60 may be a 288-pin configuration. In an example, the memory controller 20 may be a component of a computer motherboard (or main board). In another example, the memory controller 20 may be a component of a microprocessor. In yet another example, the memory controller 20 may be a component of a central processing unit (CPU).

In an example, some of the connectors (or pins or traces) 60 may be part of the memory modules 50a-50n and some of the connectors (or pins or traces) 60 may be part of the motherboard and/or memory controller 20. The memory modules 50a-50n may be connected to the computer motherboard (e.g., by pins, traces and/or connectors 60) to transfer data between components of a computing device and the memory modules 50a-50n. In some embodiments implementing UDIMM, the connectors (or pins or traces) 60 may implement a 64-bit bus or a 72-bit bus. In an example, the memory controller 20 may be implemented on a northbridge of the motherboard and/or as a component of a microprocessor (e.g., an Intel CPU, an AMD CPU, an ARM CPU, etc.). The implementation of the memory controller 20 may be varied according to the design criteria of a particular implementation.

In various embodiments, the circuits 50a-50n may be implemented as DDR5 SDRAM memory modules. In an example, the circuits 50a-50n may have a memory module density of 128 gigabyte (GB), 512 GB, one terabyte (TB), or higher per module. In embodiments implementing DDR5 standard SDRAM memory modules, the circuits 50a-50n may operate with a frequency of 1.2-3.2 giga-Hertz (GHz) and/or higher frequencies.

In embodiments implementing DDR5 standard SDRAM memory modules, the circuits 50a-50n may have a data rate range from 3.2 GT/s to 4.6 GT/s. In an example embodiment implementing DDR5 SDRAM memory modules, the circuits 50a-50n may operate at up to 8 GT/s. The operating parameters of the memory modules 50a-50n may be varied according to the design criteria of a particular implementation.

In an example, the memory modules 50a-50n may be implemented according to a fifth generation (DDR5) standard (e.g., for which a standard is currently under development by JEDEC). References to the DDR5 standard may refer to a latest working and/or draft version of the DDR5 specification published and/or distributed to committee members by JEDEC as of March 2019. Appropriate sections of the DDR5 standard are hereby incorporated by reference in their entirety. The JEDEC specification may refer to a DDR5 SDRAM specification and/or specifications for future generations of DDR SDRAM (e.g., DDR6).

Figure 2:
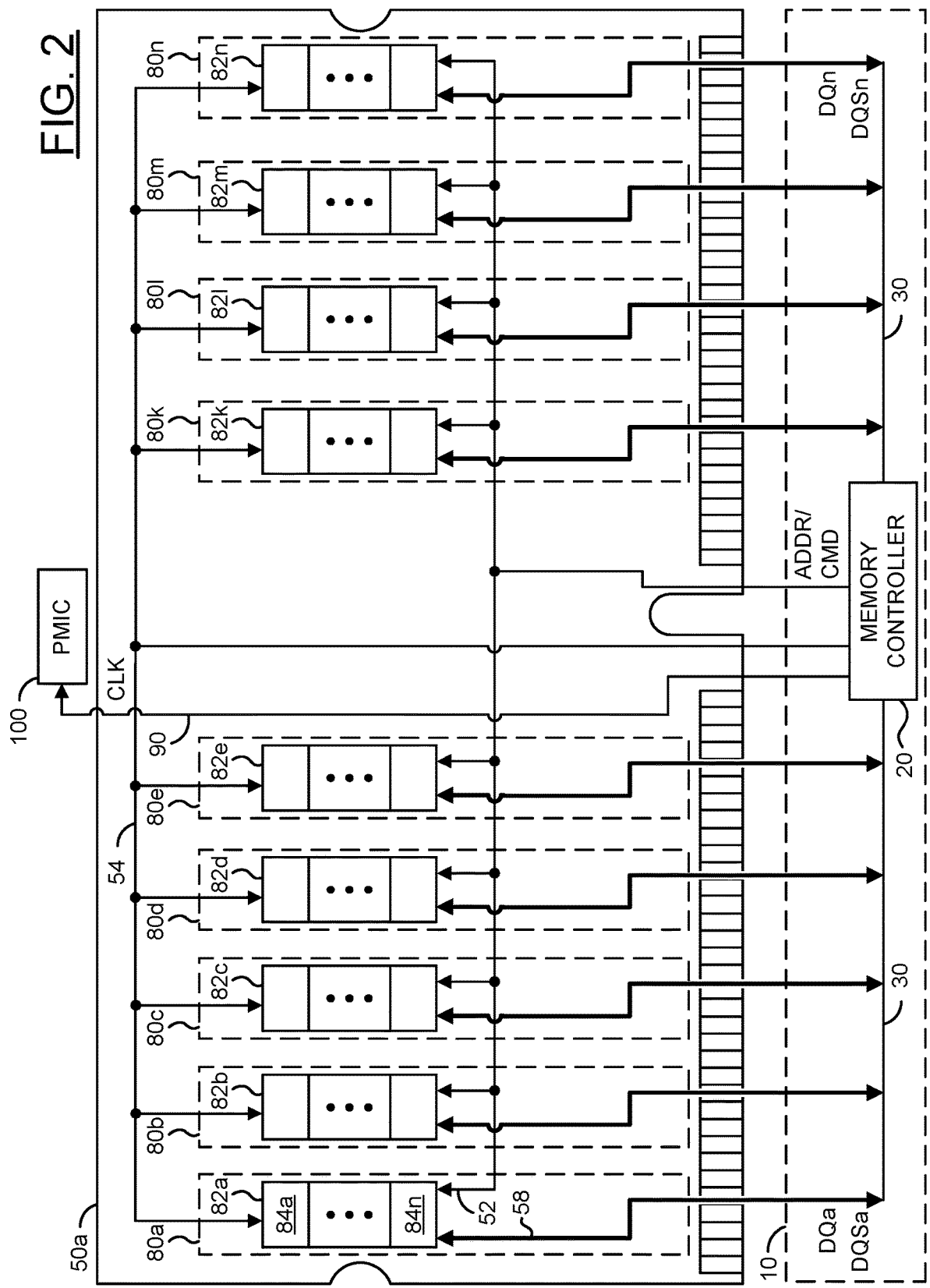
FIG. 2 is a block diagram illustrating a memory module of FIG. 1.

Referring to FIG. 2, a block diagram illustrating the memory module 50a of FIG. 1 is shown. The memory module 50a may be representative of the memory modules 50b-50n. The memory module 50a is shown communicating with the memory controller 20. The memory controller 20 is shown as part of a block (or circuit) 10. The circuit 10 may be a motherboard (or main board), or other electronic component or computing engine or host device that communicates with the memory module 50a.

The memory module 50a may comprise one or more blocks (or circuits) 80a-80n and/or the PMIC 100. The circuits 80a-80n may implement data paths of the memory module 50a. In the example shown, the memory module 50a may comprise five data paths (e.g., 80a-80e) on one side of the memory module 50a and four data paths (e.g., 80k-80n) on another side of the memory module 50a. The circuits 82a-82n may each be implemented as a memory channel. Each of the memory channels 82a-82n may comprise a number of blocks (or circuits) 84a-84n. The circuits 84a-84n may be implemented as random access memory (RAM) chips. For example, the RAM chips 84a-84n may implement a volatile memory such as dynamic RAM (DRAM). The RAM chips 84a-84n may be the SDRAM devices 72a-72n (e.g., the chips 84a-84n may comprise one or more of the circuits 72a-72n located within one of the memory channels 82a-82n). In some embodiments, the RAM chips 84a-84n may be physically located on both sides (e.g., the front and back) of the circuit board of the memory modules 50a-50n. A capacity of memory on the memory module 50a may be varied according to the design criteria of a particular implementation.

The memory controller 20 may generate a clock signal (e.g., CLK), a number of control signals (e.g., ADDR/CMD) and/or a number of commands. The signal CLK and/or the signals ADDR/CMD may be presented to the memory channels 82a-82n. In one example, the signals ADDR/CMD and CLK may be transmitted on a common bus 52 and a common bus 54, respectively. The commands may be presented to the PMIC 100 via a bus 90. A data bus 30 may be connected between the memory controller 20 and the data paths 80a-80n. The bus 30 may comprise traces, pins and/or connections between the memory controller 20 and the memory channels 82a-82n. The memory controller 20 may generate and/or receive data signals (e.g., DQa-DQn) and data strobe signals (e.g. DQSa-DQSn) that may be presented/received from the data bus 30. Portions of the signals DQa-DQn and DQSa-DQSn may be presented to respective data paths 80a-80n. For example, the signals DQa-DQn may be the DQ signals defined in the JEDEC specification and the signals DQSa-DQSn may be the DQS signals defined in the JEDEC specification. In the example shown, each of the signals DQa-DQn may have a corresponding signal DQSa-DQSn, however in some embodiments, one DQS signal may strobe multiple (e.g., four) DQ signals.

The bus 90 may be implemented as a host interface bus. The host interface bus 90 may be bi-directional. The host interface bus 90 may be configured to communicate commands and/or other data to the PMIC 100 and/or other components of the memory module 50a. In some embodiments, the host interface bus 90 may implement an I²C protocol. In some embodiments, the host interface bus 90 may implement an I3C protocol. The protocol implemented by the host interface 90 may be varied according to the design criteria of a particular implementation.

Figure 3:
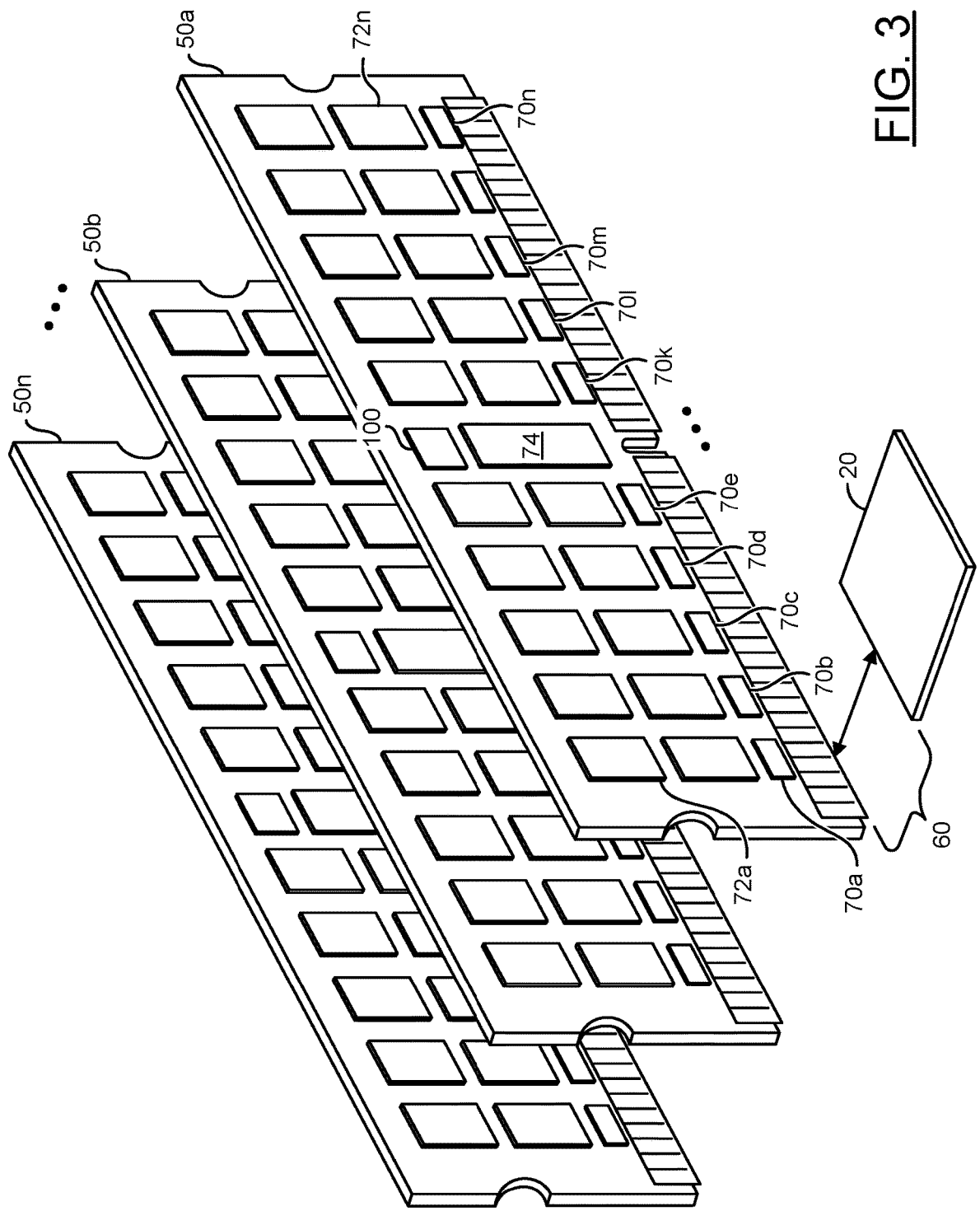
FIG. 3 is a diagram illustrating an example embodiment of a buffered memory module.

Referring to FIG. 3, a diagram of illustrating an example embodiment of a buffered memory module is shown. The buffered memory module shown in association with FIG. 3, may have a similar implementation as the unbuffered memory module shown in association with FIG. 1.

In various embodiments, the circuits 50a-50n may comprise the SDRAM devices 72a-72n, the PMIC 100, a number of blocks (or circuits) 70a-70n, a block (or circuit) 74 and/or various other blocks, circuits, pins, connectors and/or traces. The circuits 70a-70n may be configured as data buffers. The circuit 74 may be implemented as a registered clock driver (RCD). In another example, the RCD circuit 74 may be implemented as a RCD circuit compliant with the JEDEC specification (e.g., DDR5 standard). For example, in embodiments implementing the circuits 50a-50n as DDR5 compliant SDRAM modules, the memory modules 50a-50n may comprise the circuits 72a-72n arranged in rows of ten SDRAM devices (or chips, or modules), the circuits 70a-70n may be arranged in a row corresponding with the circuits 72a-72n, the RCD circuit 74 may be located so that the circuits 72a-72n are in groups of five on either of two sides of the RCD circuit 74, and the power management integrated circuit 100 may be compliant with the JEDEC DDR5 specification. In embodiments implementing DDR5 standard SDRAM memory modules, there may be 5 memory modules on each side of the RCD 74. In some embodiments, the connectors (or pins or traces) 60 may implement an 80-bit bus. The number, type and/or arrangement of components of the circuits 50a-50n may be varied according to the design criteria of a particular implementation.

Figure 4:
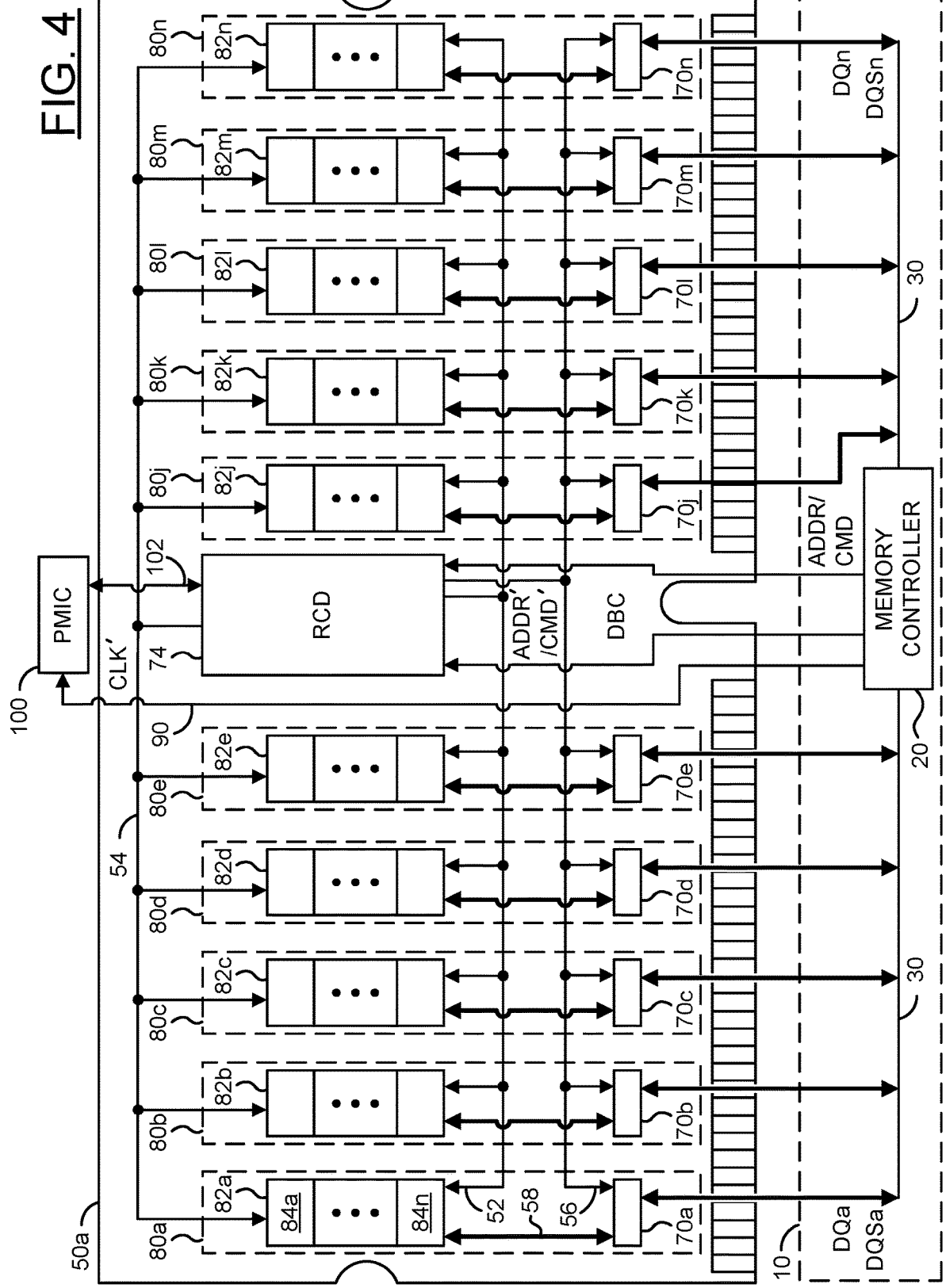
FIG. 4 is a block diagram illustrating a memory module of FIG. 3.

Referring to FIG. 4, a block diagram illustrating a memory module of FIG. 3 is shown. The memory module 50a may comprise the data paths 80a-80n, the RCD circuit 74 and/or the PMIC 100. For example, the data path 80a may include the memory channel 82a and/or the data buffer 70a. The data paths 80b-80n may have similar implementations. In the example shown, the memory module 50a may comprise five data paths (e.g., 80a-80e) on one side of the RCD 74 and five data paths (e.g., 80j-80n) on another side of the RCD 74.

The RCD circuit 74 may be configured to communicate with the memory controller 20, the data buffers 70a-70n, the memory channels 82a-82n and/or the PMIC 100. The RCD circuit 74 may decode instructions (e.g., control words) received from the memory controller 20. The signal CLK and/or the signals ADDR/CMD may be presented to the RCD circuit 74. For example, the RCD circuit 74 may receive register command words (RCWs). In another example, the RCD circuit 74 may receive buffer control words (BCWs). The RCD circuit 74 may be configured to train the DRAM chips 84a-84n, the data buffers 70a-70n and/or command and address lines between the RCD circuit 74 and the memory controller 20. For example, the RCWs may flow from the memory controller 20 to the RCD circuit 74. The RCWs may be used to configure the RCD circuit 74.

The RCD circuit 74 may be used in both LRDIMM and RDIMM configurations. The RCD circuit 74 may implement a 32-bit 1:2 command/address register. For example, the RCD circuit 74 may have two sets (e.g., A and B) of command/address outputs. The RCD circuit 74 may support an at-speed bus (e.g., a BCOM bus between the RCD circuit 74 and the data buffers 70a-70n). The RCD circuit 74 may implement automatic impedance calibration. The RCD circuit 74 may implement command/address parity checking. The RCD circuit 74 may control register RCW readback. In an example, the RCD circuit 74 may implement a serial communication bus (e.g., a 1 MHz inter-integrated circuit (I²C) bus, etc.). However, other types of management bus protocols (e.g., sideband interface, etc.) may be implemented to meet design criteria of particular implementations. In some embodiments, the RCD circuit 74 may implement a 12.5 MHz inter-integrated circuit (I³C) bus.

Inputs to the RCD circuit 74 may be pseudo-differential using external and/or internal reference voltages. The clock outputs, command/address outputs, control outputs and/or data buffer control outputs of the RCD circuit 74 may be enabled in groups and independently driven with different strengths.

The RCD circuit 74 may receive the signal CLK and/or the signals ADDR/CMD from the memory controller 20. Various digital logic components of the RCD circuit 74 may be used to generate signals based on the signal CLK and/or the signals ADDR/CMD and/or other signals (e.g., RCWs). The RCD circuit 74 may also be configured to generate a signal (e.g., CLK') and signals (e.g., ADDR'/CMD'). The signal CLK' and/or the signals ADDR'/CMD' may be presented to each of the memory channels 82a-82n. In one example, the signals ADDR'/CMD' and CLK' may be transmitted on a common bus 52 and a common bus 54, respectively. In another example, the RCD circuit 74 may implement a single ADDR/CMD input and two ADDR'/CMD' outputs to support a 1:2 command/address architecture. The RCD circuit 74 may generate one or more signals (e.g., DBC). The signals DBC may be presented to the data buffers 70a-70n. The signals DBC may implement data buffer control signals. The signals DBC may be transmitted on a common bus 56 (e.g., a data buffer control bus).

The data buffers 70a-70n may be configured to receive commands and data from the bus 56. The data buffers 70a-70n may be configured to generate/receive data to/from the bus 30. The bus 30 may comprise traces, pins and/or connections between the memory controller 20 and the data buffers 70a-70n. A bus 58 may carry the data between each of the data buffers 70a-70n and respective memory channels 82a-82n. The data buffers 70a-70n may be configured to buffer data on the buses 30 and 58 for write operations (e.g., data transfers from the memory controller 20 to the corresponding memory channels 82a-82n). The data buffers 70a-70n may be configured to buffer data on the buses 30 and 58 for read operations (e.g., data transfers from the corresponding memory channels 82a-82n to the memory controller 20).

The data buffers 70a-70n may exchange data with the DRAM chips 84a-84n in small units (e.g., 4-bit nibbles for ×4 DRAMS or 8-bit bytes for ×8 DRAMs). In various embodiments, the DRAM chips 84a-84n may be arranged in multiple (e.g., two) sets. For two set/two DRAM chip (e.g., 84a-84b) implementations, each set may contain a single DRAM chip (e.g., 84a or 84b). Each DRAM chip 84a-84n may be connected to the respective data buffers 70a-70n through an upper nibble and a lower nibble, or a byte. For two set/four DRAM chip (e.g., 84a-84d) implementations, each set may contain two DRAM chips (e.g., 84a-84b or 84c-84d). A first set may be connected to the respective data buffers 70a-70n through the upper nibble. The other set may be connected to the respective data buffers 70a-70n through the lower nibble. For two set/eight DRAM chip (e.g., 84a-84h) implementations, each set may contain four of the DRAM chips 84a-84h. A set of four DRAM chips (e.g., 84a-84d) may connect to the respective data buffers 70a-70n through the upper nibble. The other set of four DRAM chips (e.g., 84e-84h) may connect to the respective data buffers 70a-70n through the lower nibble. Other numbers of sets, other numbers of DRAM chips, and other data unit sizes may be implemented to meet the design criteria of a particular implementation.

An interface 102 is shown. The interface 102 may be configured to enable communication between the RCD circuit 74 and the PMIC 100. For example, the interface 102 may implement a register clock driver/power management integrated circuit interface (e.g., a RCD-PMIC interface). The interface 102 may comprise one or more signals and/or connections. Some of the signals and/or connections implemented by the interface 102 may be unidirectional. Some of the signals and/or connections implemented by the interface 102 may be bidirectional. The interface 102 may be enabled by the host memory controller 20. In one example, the memory controller 20 may enable the interface 102 for the RCD using the signal ADDR/CMD. In another example, the memory controller 20 may enable the interface 102 for the PMIC 100 by presenting an enable command. In some embodiments, the bus 90 may communicate with the RCD 74.

Figure 5:
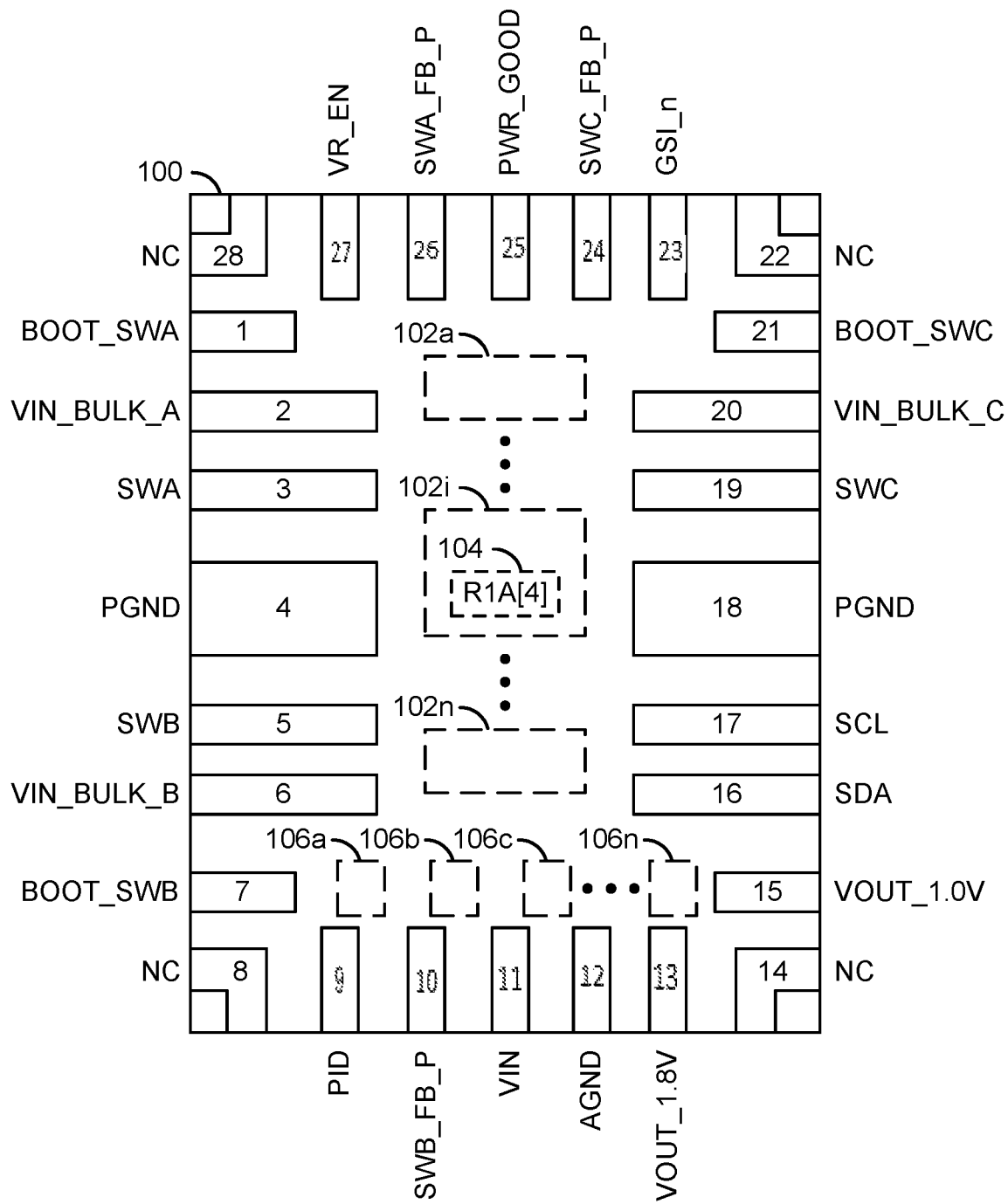
FIG. 5 is a diagram illustrating a pinout diagram of a power management integrated circuit.

Referring to FIG. 5, a diagram illustrating a pinout diagram of a power management integrated circuit is shown. A top view of the microchip package of the PMIC 100 is shown. In an example, the microchip package of the PMIC 100 may be implemented as a quad-flat no-leads (QFN) package. For example, the QFN package of the PMIC 100 may be approximately 4 mm×3 mm in size. The amount of space available for the PMIC 100 on the circuits 50a-50n may be limited.

A number of pins are shown for the PMIC 100. The PMIC 100 may be implemented having 28 pins (e.g., pin1-pin28). Since the amount of space available for the PMIC 100 may be limited, the size of the PMIC 100 may be constrained to a particular specification. The pinout of the PMIC 100 may be implemented according to the design criteria according to the JEDEC DDR5 specification. In some embodiments, the pinout of the PMIC 100 may be pre-defined according to the JEDEC DDR5 specification. For example, adding more pins to the PMIC 100 may not be possible due to size constraints.

Generally, the pins pin1-pin28 may each have a pre-defined functionality. One or more of the pins pin1-pin28 of the PMIC 100 may be a host interface. The PMIC 100 may be configured to implement entering and/or exiting the P1 state and the P3a state using the available pins pin1-pin28. The PMIC 100 may be configured to add additional functionality to one or more of the pins pin1-pin28 while enabling the pre-defined functionality of each of the pins pin1-pin28.

In the example shown, the pins pin 2, pin 6 and pin 20 may each communicate a signal (e.g., VIN_BULK_A, VIN_BULK_B and VIN_BULK_C, respectively may together be a signal VIN_BULK). The pin pin13 may communicate a signal (e.g., VOUT_1.8V). The pin pin15 may communicate a signal (e.g., VOUT_1.0V). The pin pin3 may communicate a signal (e.g., SWA). The pin pin5 may communicate a signal (e.g., SWB). The pin pin19 may communicate a signal (e.g., SWC). The pin pin9 may communicate a signal (e.g., PID). The pin pin23 may communicate a signal (e.g., GSI_n). The pin pin25 may communicate a signal (e.g., PWR_GOOD). The pin pin27 may communicate a signal (e.g., VR_EN). The pinout of the PMIC 100 may be varied according to the design criteria of a particular implementation and/or according to the DDR5 standard JEDEC specification.

The PMIC 100 may comprise blocks (or circuits) 102a-102n. The circuits 102a-102n may each implement a register. Each of the registers 102a-102n may comprise locations. In an example, a location 104 is shown in the register 102i. The register 102i may be a power state entry register. The PMIC 100 may further comprise blocks (or circuits) 106a-106n. The circuits 106a-106n may each implement a regulator. The PMIC 100 may comprise other components (not shown). The number, type and/or arrangement of the components of the PMIC 100 may be varied according to the design criteria of a particular implementation.

The registers 102a-102n may be configured to provide volatile storage. The registers 102a-102n may have an attribute that may be read only, read/write, write only or reserved. A subset of the registers 102a-102n may comprise a region that is accessible by the host controller 20. For example, the host controller 20 may be configured to read from and write to a subset of the registers 102a-102n. A subset of the registers 102a-102n may enable a DIMM vendor (e.g., the vendor of the circuits 50a-50n) to program the PMIC 100. A subset of the registers 102a-102n may be a PMIC vendor (e.g., a vendor of the PMIC 100) specific region. The registers 102a-102n may be configured to provide various functions of the PMIC 100 (e.g., error logs, status information (real time and periodic), masking, power state entry, current threshold, voltage settings, temperature readings, power measurements, etc.). The functionality of the registers 102a-102n may be varied according to the design criteria of a particular implementation.

The registers 102a-102n may be 8-bit registers. In an example, the registers 102a-102n may comprise 8 storage locations (or register values). The register value 104 may be a representative example of one of the register values (or storage locations) of the registers 102a-102n. In the example shown, the register 102i may be the R1A register and the register value 104 may be a R1A[4] value (e.g., bit 4 of bits 0:7 of the register R1A). The value stored in the register value 104 may be configured to enable the additional functionality of one or more of the pins pin1-pin28. The register value 104 may be configured to enable the PMIC 100 to enable the low power (e.g., quiescent) state. The register value 104 may be configured to control entering and/or exiting the low power state and the idle power state.

The register 102i may be one of the subset of the registers 102a-102n that may be accessed by the host controller 20. The register value 104 may be a read/write value (e.g., the host controller 20 may read from or write to the register value 104). The register value 104 may be a PMIC quiescent state entry enable value (e.g., QUIESCENT_STATE_EN). In an example, when the register value 104 has a low (e.g., a logical 0) value, the quiescent state may be disabled. In an example, when the register value 104 has a high (e.g., a logical 1) value, the quiescent state may be enabled.

The regulators 106a-106n may comprise switching regulators and/or low-dropout (LDO) regulators. In an example, the regulator 106a may be the SWA regulator, the regulator 106b may be the SWB regulator and the regulator 106c may be the SWC regulator. The regulators 106a-106c may be switch node output buck regulators connected to power inductors. In another example, the regulator 106d may be the 1.8V LDO regulator and the regulator 106e may be the 1.0V LDO regulator. The number and/or type of regulators implemented may be varied according to the design criteria of a particular implementation.

The signal VIN_BULK may be the 5V power input supply to the PMIC 100 for one or more of the regulators 106a-106n. In an example, the signal VIN_BULK_A may be an input supply for the SWA regulator 106a, the signal VIN_BULK_B may be an input supply for the SWB regulator 106b and the signal VIN_BULK_C may be an input supply for the SWC regulator 106c. The signal VOUT_1.8V may be the 1.8V output for the LDO regulator 106d. The signal VOUT_1.0V may be the 1.0V output for the LDO regulator 106e. The signal SWA may be an output for the SWA regulator 106a, the signal SWB may be an output for the switch regulator 106b and the signal SWC may be an output for the switch regulator 106c. The signal PID may receive an ID for the I²C and I3C bus. The signal GSI_n may provide a general status interrupt output. The signal GSI_n may be an open drain output configured to communicate events to the host controller 20.

The signal PWR_GOOD may be an open drain output configured to indicate a power status of the PMIC 100. For example, the signal PWR_GOOD may be asserted high when VIN_BULK as well as all enable regulators 106a-106n are maintained within a tolerance threshold as configured by the corresponding registers 102a-102n. In an example, the signal PWR_GOOD may be asserted low when VIN_BULK is below the threshold or when any of the enabled regulators 106a-106n exceed the tolerance threshold. The signal PWR_GOOD may be configured as I/O. For example, in a low power state of operation, the pin25 for the signal PWR_GOOD may operate as I/O. In another example, the pin25 for the signal PWR_GOOD may be output only.

The signal VR_EN may be a PMIC enable input signal. In an example, when the signal VR_EN is asserted as high, the PMIC 100 may turn on one of the regulators 106a-106n. In an example, when the signal VR_EN is asserted as low, the PMIC 100 may turn off one of the regulators 106a-106n. The pin27 may be an enable pin for the host interface of the PMIC 100. The enable pin pin27 may be an input configured to control a status of one or more of the regulators 106a-106n.

When mask bits of the registers 102a-102n are not set, the PMIC 100 may assert the output signal GSI_n and the signal PWR_GOOD when any event occurs. In an example, various events may cause the PMIC 100 to internally generate a VR Disable command (e.g., over voltage or under voltage of the signal VIN_BULK, over voltage or under voltage of the signals SWA-SWC, critical temperature, etc.). For events that do not trigger the VR Disable command, the PMIC 100 may operate normally. The host controller 20 may be configured to read the registers 102a-102n that are status registers to determine and/or isolate the cause of the assertion of the signal GSI_n or the signal PWR_GOOD. The PMIC 100 may keep the signal GSI_n or the signal PWR_GOOD asserted until the host controller 20 clears or masks the appropriate registers 102a-102n.

In some embodiments, in the low power (e.g., quiescent) P1 state, a current of VIN_BULK may be approximately 25 µA (with VIN_BULK at 5V). All the circuitry in the PMIC 100, including all the regulators 106a-106n may be turned off. The signal VR_EN may be set to a static low or static high state. The signal GSI_n may be pulled high. Access to the I²C or I3C interface may be disabled and the bus may be pulled high. The signal PID may be pulled either high or low.

In some embodiments, in the idle power P3a state, a current of VIN_BULK may be approximately 100 µA (with VIN_BULK at 5V). All the output and/or LDO regulators 106a-106n may be turned on with a 0A output load. The signal VR_EN may be set to a static low or static high state. The signal GSI_n may be pulled high. Access to the I²C or I3C interface may be enabled and the bus may be pulled high. The signal PID may be pulled either high or low.

The PMIC 100 may be configured to operate in a secure mode of operation or a programmable mode of operation. Whether the PMIC 100 operates in the secure mode of operation or the programmable mode of operation may be determined by one of the values of the registers 102a-102n. In an example, one of the register values for one of the registers 102a-102n (e.g., the register value R2F[2]) may be used to determine which mode of operation to function in for the PMIC 100. The mode of operation of the PMIC 100 may be selected after the VR Enable command provided by the host controller 20 (e.g., either using the signal VR_EN at the pin pin27 or providing the command on the I²C/I3C bus) is registered.

In the programmable mode of operation, when the host controller 20 issues a VR Enable command (e.g., using the signal VR_EN or the I²C/I3C bus), the PMIC 100 may be configured to allow modification to any of the registers 102a-102n based on the commands provided by the host controller 20. The host controller 20 may modify any of the registers 102a-102n that are part of the host subset of the registers 102a-102n. The PMIC 100 may operate in response to the programming of the registers 102a-102n by the host controller 20.

In the secure mode of operation, the PMIC 100 may be configured to not allow the host controller 20 to modify some of the registers 102a-102n (e.g., secured registers). For example, in the secure mode of operation, some of the registers 102a-102n may be modified and some of the registers 102a-102n may not be allowed to be modified by the host 20. The PMIC 100 may be configured to ignore requests from the host controller 20 that correspond to some of the registers 102a-102n. For example, the registers R15-R2F, the registers R32-R34, the registers R40-R6F and/or the registers R70-RFF of the registers 102a-102n (e.g., secured registers) may not be modified while the PMIC 100 is operating in the secure mode of operation. Generally, the PMIC 100 may write protect some of the registers 102a-102n in the secure mode of operation but there may be no restriction on the read operation for the registers 102a-102n in the secure mode of operation (or the programmable mode of operation).

The host controller 20 may power cycle the PMIC 100 to be able to write to the secured registers when the PMIC 100 has entered the secure mode of operation. The power cycle of the PMIC 100 may be a complete removal of the signal VIN_BULK to the PMIC 100 (e.g., no input to the pins pin2, pin6 and pin20). The secure mode of operation may only be entered once the VR Enable command has been provided by the host controller 20. For example, the register R2F[2] may equal zero by default when the PMIC 100 is powered up (e.g., corresponding to the secure mode of operation), but the PMIC 100 may allow modification of any of the registers 102a-102n (from the host subset) by the host controller 20 before the VR Enable command is provided.

Some of the registers 102a-102n may store a threshold value. In an example, one or more of the registers 102a-102n may store a threshold voltage for the signal SWA, the signal SWB and/or the signal SWC. The PMIC 100 may actively monitor the output voltage on each of the regulators 106a-106n that are enabled. In the programming mode of operation, when the PMIC 100 detects that any of the switching regulators (e.g., the regulators 106a-106c) have the overvoltage condition, the PMIC 100 may generate the VR Disable command, disable the switching regulators 106a-106c, update the registers 102a-102n, assert the signal GSI_n and assert the signal PWR_GOOD (the LDO regulators 106d-106e may be kept active). The PMIC 100 may enable the host controller 20 to access the registers 102a-102n to determine the cause of the overvoltage condition and clear the appropriate registers. Once the host controller 20 clears the appropriate registers and issues the VR_Enable command, the switching regulators 106a-106c may be re-enabled by the host controller 20. In the secure mode of operation, when the PMIC 100 detects any of the switching regulators 106a-106c have the overvoltage condition, the PMIC 100 may respond similarly to the programming mode of operation but the host controller 20 may power cycle the PMIC 100.

Figure 6:
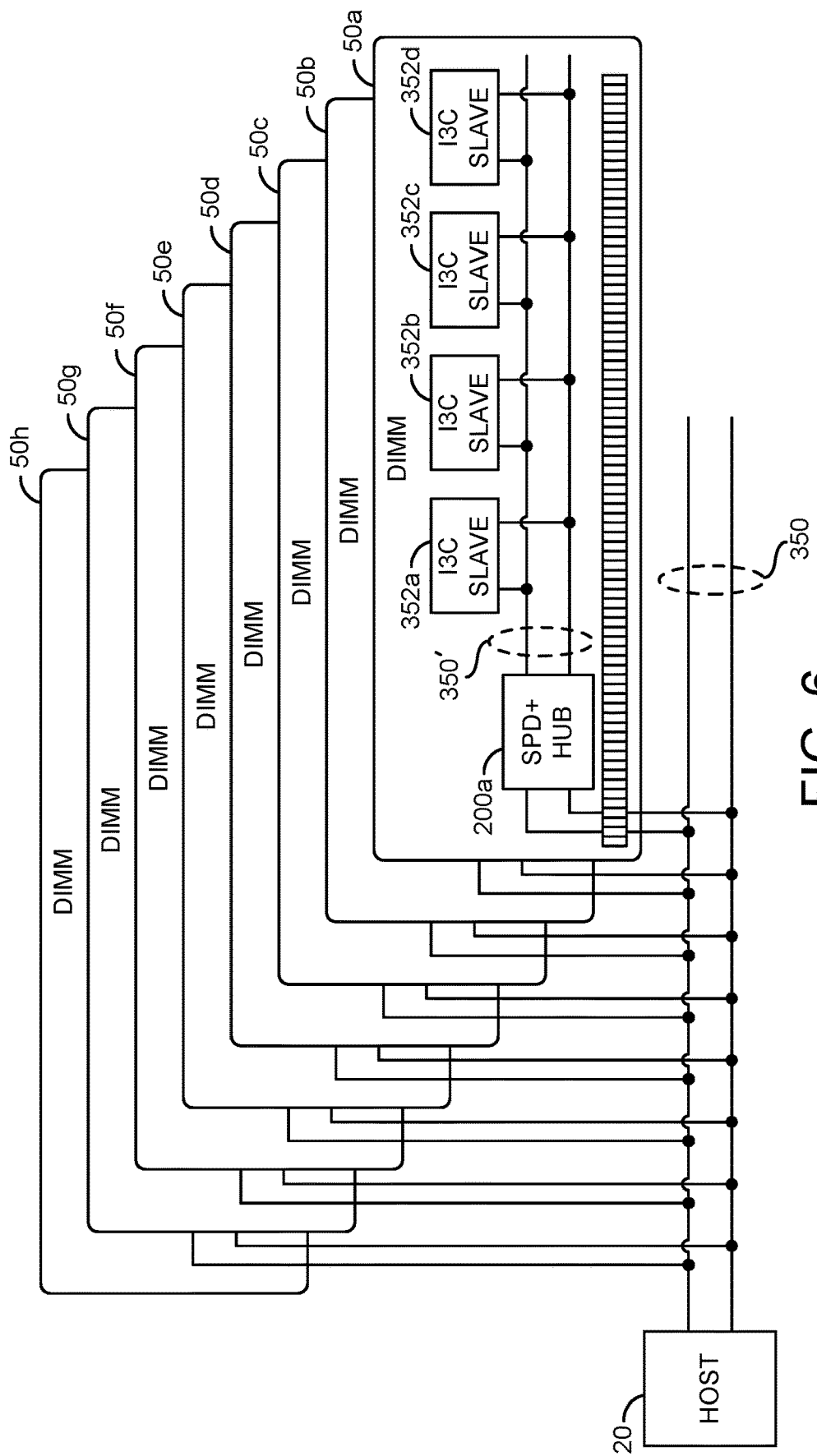
FIG. 6 is a diagram illustrating a $I^2C/I^3C$ bus between a host memory controller and memory modules.

Referring to FIG. 6, a diagram illustrating a I²C/I3C bus between the host memory controller 20 and memory modules 50a-50h is shown. A system bus 350 is shown. The system bus 350 may implement an I²C or I3C protocol. In one example, the system bus 350 may correspond with the host interface bus 90 shown in association with FIG. 2. Generally, the system bus 350 may communicate with 8 DIMMs per bus (e.g., the memory modules 50a-50h).

The memory modules 50a-50h may each comprise a respective hub 200a-200h and/or a number of devices 352a-352n. The hub 200a-200h may implement a Serial Presence Detect (SPD) hub. Each of the SPD hubs 200a-200h may enable the memory controller 20 to access information about the memory modules 50a-50h. For example, each SPD hub 200a-200h may provide access to an amount of memory installed, what timings to use, etc. In one example, the SPD hubs 200a-200h may communicate using the I²C protocol. In another example, the SPD hubs 200a-200h may communicate using the I3C protocol. The SPD hubs 200a-200n may be configured to present an enable command from the host memory controller 20 to the PMIC 100.

In the example shown, the SPD hub 200a and the slave devices 352a-352d are shown as a representative example corresponding to the memory module 50a. In an example, the slave devices 352a-352d may be the PMIC 100, the RCD 74 and two temperature sensors. A portion 350' of the system bus 350 is shown on the memory module 50a communicating between the SPD hub 200a and the slave devices 352a-352d. In some embodiments, the system bus 350 may communicate with at least five devices per memory module 50a-50h (e.g., to receive a power measurement readout, a status of the PMIC 100, a temperature readout, a status of the SPD and/or a status of the RCD 74).

In an example of the system bus 350 implementing the I3C protocol (e.g., operating at 12.5 MHz), a total amount of time for a basic periodic readout (e.g., excluding packet error check (PEC), IBI check and/or software overhead) may be approximately 464 µs. For example, using only the system bus 350, the PMIC current/power read out time may be approximately 128 µs (e.g., 8*16) with one PMIC per DIMM and 256 µs (e.g., 2*8*16) with two PMICs per DIMM. In another example, using only the system bus 350, the PMIC general status read out time may be approximately 128 µs (e.g., 8*16) with one PMIC per DIMM and 256 µs (e.g., 2*8*16) with 2 PMICs per DIMM.

In yet another example, using only the system bus 350, the temperature sensor (TS) read out time may be 128 µs (e.g., 8*2*8) with two temperature sensors per DIMM and 48 µs (8*6) with 1 SPD TS per DIMM. In still another example, using only the system bus 350, the SPD readout time may be approximately 80 µs with 1 SPD per DIMM (e.g., likely two registers (MR48 and MR52) would be read in addition to the SPD TS). Additionally, using only the system bus 350 may further include an RCD read out time. In another example, using the I²C bus protocol (e.g., running at 1 MHZ), the total time for the basic period readout may be approximately 5.5 ms.

The PMIC 100 may be configured to provide live measured power and/or current consumption for each rail (e.g., on each voltage regulator module. In an example, the memory controller 20 may access the power data and leverage the information to adjust access patterns for the DRAM modules 72a-72n. The system bus 350 may be configured to enable the memory controller 20 to access the power data (e.g., via the I²C/I3C protocol).

At power on, by default, the PMIC 100 may operate in the I²C mode of operation. Under the I²C mode of operation, the PMIC 100 may have a maximum operation speed limited to 1 MHz, in-band interrupts may not be supported, resetting the bus 350 may be supported, parity checks may not be supported (other than supported CCCs) and packet error check may not be supported. The PMIC 100 may operate in the I²C mode until the host 20 provides a command to enter the I3C mode of operation. In an example, the host 20 may issue a SETAASA CCC command to initiate the I3C mode of operation. In the I3C mode of operation, the PMIC 100 may have a maximum operation speed of up to 12.5 MHz, in-band interrupts may be supported, resetting the bus 350 may be supported, parity checks may be enabled by default and packet error checks may be supported but disabled by default.

Figure 7:
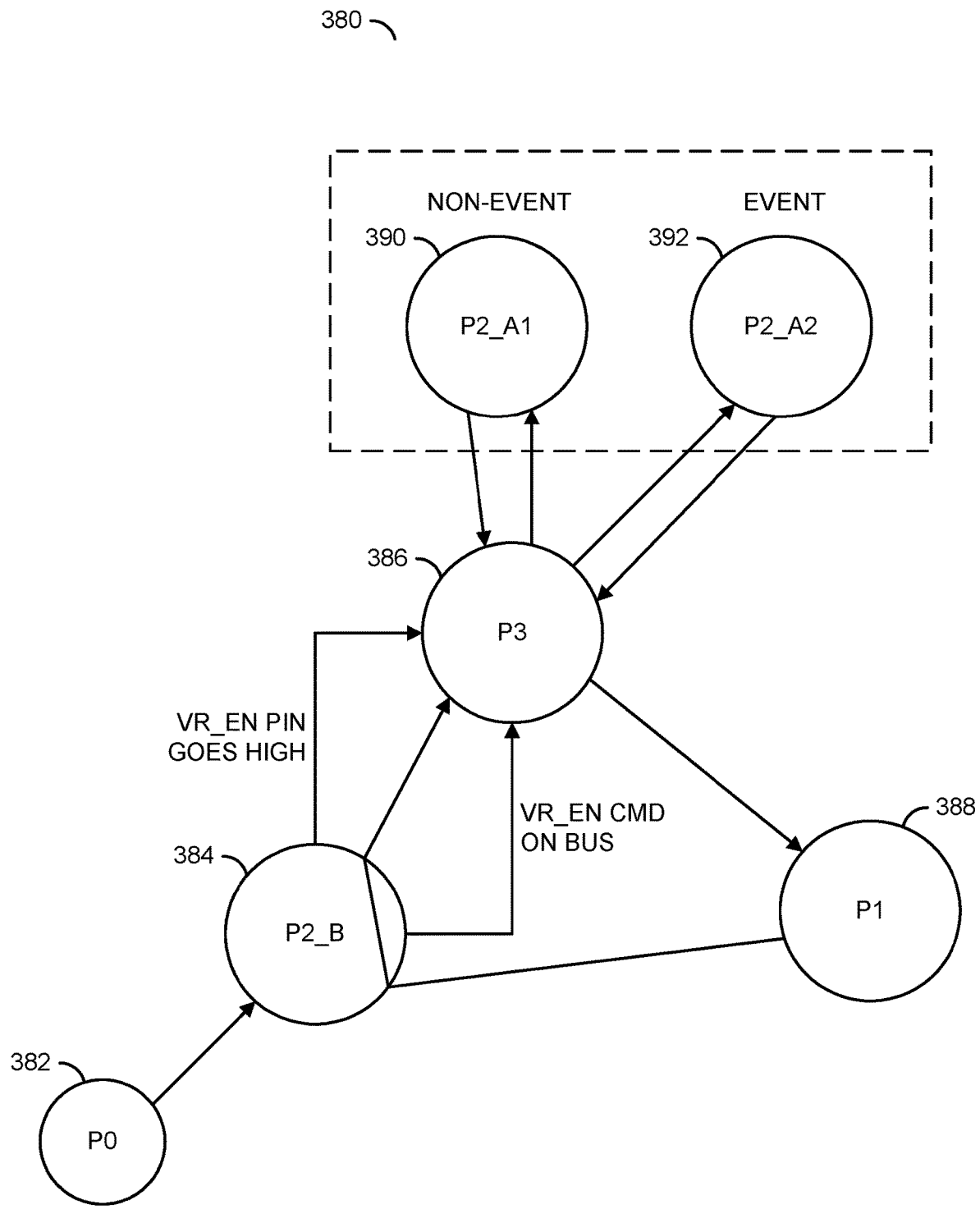
FIG. 7 is a state diagram illustrating entry to and exit from a quiescent power state.

Referring to FIG. 7, a state diagram illustrating entry to and exit from a quiescent power state is shown. A state diagram 380 is shown. The state diagram 380 may comprise power states 382-392. The power state 382 may be a P0 state. The power state 384 may be a P2_B power state. The power state 386 may be a P3 (or P3a) power state. The power state 388 may be a P1 power state. The state 390 may be a P2_A1 power state. The power state 392 may be a P2_A2 power state. The power states 382-392 may be power states that the PMIC 100 may be configured to operate in. The PMIC 100 may comprise other power states (not shown). The number and/or type of power states implemented by the PMIC 100 may be varied according to the design criteria of a particular implementation.

In the P0 power state 382, the signal VIN_BULK may be invalid and the PWR_GOOD signal may be a logical low value. For example, there may be no input to the pins pin2, pin6 and pin20. The P0 power state 382 may be a power cycle of the PMIC 100. From the P0 power state 382, the PMIC 100 may move to the P2_B power state 384.

In the P2_B power state 384, all the switching regulators 106a-106c may be off and all the LDO regulators 106d-106e may be on. In the P2_B power state 384, the signal PWR_GOOD may be a logical low value and the signal VR_EN may be a logical low value (or high impedance state). In the P2_B power state 384, the register value R32[7] may be zero. The P2_B power state 384, may be a transition state from the P0 power state 382 and/or the P1 power state 388 before the VR Enable command. When the signal VR_EN transitions to high or the VR Enable command is on the I²C/I3C bus 90 the P2_B power state 384 may move to the P3 power state 386.

In the P3 power state 386, all the switching regulators 106a-106c may be on. In an example, the P3 power state 386, may be a regulation mode of operation and/or a VIN_BULK link monitor mode of operation. In the P3 power state 386, the register value R32[7] may be a one. In one example, in the P3 power state 386 the PMIC 100 may have a current of approximately 100 μA at 5V VIN_BULK.

In the P3 power state 386, if the VR_EN pin transitions from high to low, the R32[5] register is set to 0 and the register value 104 is set to 0, then the signal PWR_GOOD may be low and the PMIC 100 may move to the P2_A1 power state 390. In the P3 power state 386, if the VR_EN pin transitions from high to low, the R32[5] register is set to 0 and the register value 104 is set to 1, then the signal PWR_GOOD may be low and the PMIC 100 may move to the P1 power state 388. In the P3 power state 386, if the VR_EN pin transitions from high to low and the R32[5] register is set to 1, then the PMIC 100 may be in an improper configuration (e.g., simultaneous usage of the signal VR_EN and the signal PWR_GOOD as an I/O type may be improper since the VR_EN pin may be intended to turn on or off output rails only when the signal PWR_GOOD is configured as I/O and the signal PWR_GOOD may be tied to GND if the signal PWR_GOOD is configured as I/O). In the P3 power state 386, if the VR_EN pin transitions from low to high, then the signal PWR_GOOD may be in a high impedance state and the PMIC 100 may move remain in the P3 power state 386 (e.g., assuming the PMIC entered the P3 power state 386 from the VR Enable command on the I²C/I3C bus 90).

In the P3 power state 386, if the VR Enable command is on the I²C/I3C bus 90, the R2F[2] register is set to 1 and the register value 104 is set to 0, then the signal PWR_GOOD may be in a high impedance state and the PMIC 100 may move to the P2_A1 power state 390. In the P3 power state 386, if the VR Enable command is on the I²C/I3C bus 90, the R2F[2] register is set to 1 and the register value 104 is set to 1, then the signal PWR_GOOD may be in a high impedance state and the PMIC 100 may move to the P1 power state 388. In the P3 power state 386, if the VR Enable command is on the I²C/I3C bus 90, the R2F[2] register is set to 0, then the signal PWR_GOOD may be in a high impedance state and the PMIC 100 may remain in the P3 power state 386. In the P3 power state 386, if the VR disable command is on the I²C/I3C bus 90, then the signal PWR_GOOD may be in a high impedance state and the PMIC 100 may remain in the P3 power state 386 (e.g., assuming the PMIC 100 entered the P3 power state 386 with the VR_EN pin transition to high).

In the P3 power state 386, if signal PWR_GOOD is input as low and the R32[5] register is set to 0, then the signal PWR_GOOD may be in a high impedance state and the PMIC 100 remain in the P3 power state 386 (e.g., the PWR_GOOD I/O type may be configured as output only, the PWR_GOOD input may be low but internally the output signal PWR_GOOD may be in a high impedance state). In the P3 power state 386, if signal PWR_GOOD is input as low and the R32[5] register is set to 1, then the signal PWR_GOOD may be low and the PMIC 100 remain in the P2_A1 power state 390.

In the P3 power state 386, if there is an internal VR Disable event and the R2F[2] register is set to 0, then the signal PWR_GOOD may be low, the PMIC 100 may move to the P2_A1 power state 390 and the PMIC 100 may need a power cycle. In the P3 power state 386, if there is an internal VR Disable event and the R2F[2] register is set to 1, then the signal PWR_GOOD may be low, the PMIC 100 may move to the P2_A1 power state 390 and the PMIC 100 may not need a power cycle (e.g., the PMIC 100 may re-enable the output regulators 106a-106n with the VR Enable command assuming the event is no longer present and the status registers are cleared). In the P3 power state 386, if the signal VIN_BULK is invalid, then the PMIC 100 may move to the P0 power state 382.

In the P1 power state 388, the register value 104 may be set to 1. The P1 power state 388 may only have entry from the P3 power state 386. In the P1 power state 388, if the VR_EN pin transitions from low to high and the register value 104 is set to 1, then the signal PWR_GOOD may be in a high impedance state, no power cycle may be needed and the PMIC 100 may move to the P3 power state 386. In the P1 power state 388, if the VR Enable or the VR Disable command is set on the I²C/I3C bus 90 and the register value 104 is set to 1, then the signal PWR_GOOD may have no change and the PMIC 100 may remain in the P1 power state 388. In one example, in the P1 power state 388 the PMIC 100 may have a current of approximately 25 µA at 5V VIN_BULK. For example, in the P1 power state 388, the PMIC 100 may consume less power than the P3 power state 386.

The P2_A1 power state 390 may be a no fault event state. The P2_A1 power state 390 may transition from the P3 power state 386 after the VR Enable command. In the P2_A1 power state 390, all the switching regulators 106a-106c may be off. In the P2_A1 power state 390, all the LDO regulators 106e-106f may be on. In the P2_A1 power state 390, the signal PWR_GOOD may be low or high, the input signal VR_EN may be low or high and the register R32[7] may be set to 0.

In the P2_A1 power state 390, if the VR_EN pin transitions from high to low, there may be no change (e.g., the PMIC 100 may already be in the P2_A1 power state 390 and the VR_EN pin may have no meaning). In the P2_A1 power state 390, if the VR_EN pin transitions from low to high, and the register R32[5] is set to 1, then the PMIC 100 may be in an improper configuration. In the P2_A1 power state 390, if the VR_EN pin transitions from low to high, the register R32[5] is set to 0 and the register value 104 is set to 0, then the signal PWR_GOOD may be in a high impedance state and the PMIC 100 may move to the P3 power state 386. Generally, the P2_A1 power state 390 may not enter the P2_A1 power state 390 if there is no event (e.g., the register value 104 is set to 1).

In the P2_A1 power state 390, if the VR Disable command is on the I²C/I3C bus 90, there may be no change (e.g., the PMIC 100 is already in the P2_A1 power state 390 via the VR_EN pin, the VR Disable command may have no effect). In the P2_A1 power state 390, if the VR Enable command is on the I²C/I3C bus 90, and the register R2F[2] is set to 0, there may be no change. In the P2_A1 power state 390, if the VR Enable command is on the I²C/I3C bus 90, and the register R2F[2] is set to 1, then the signal PWR_GOOD may be in a high impedance state and the PMIC 100 may move to the P3 power state 386 and no power cycle may be needed.

In the P2_A1 power state 390, if there is an internal VR Disable event and the register R2F[2] is set to 0, then the signal PWR_GOOD may be set to low, a power cycle may be needed, and the PMIC 100 may move to the P2_A2 power state 392. In the P2_A1 power state 390, if there is an internal VR Disable event and the register R2F[2] is set to 1, then the signal PWR_GOOD may be set to low, a power cycle may not be needed, and the PMIC 100 may move to the P2_A2 power state 392 (e.g., the PMIC 100 may re-enable the output regulators 106a-106n with the VR Enable command assuming the event is no longer present and the status registers are cleared and the PMIC 100 may require a power cycle if there is a thermal shutdown regardless of the settings of the registers 102a-102n). In the power state P2_A1, if the signal VIN_BULK is invalid then the PMIC 100 may move to the P0 power state 382.

The P2_A2 power state 392 may be a fault event state. The P2_A2 power state 392 may transition from the P3 power state 386 after the VR Enable command. In the P2_A2 power state 392, all the switching regulators 106a-106c may be off. In the P2_A2 power state 392, all the LDO regulators 106e-106f may be on. In the P2_A2 power state 392, the signal PWR_GOOD output may be low, the input signal VR_EN may be low or high and the register R32[7] may be set to 0.

In the P2_A2 power state 392, if the VR_EN pin transitions from high to low, there may be no change (e.g., the PMIC 100 may already be in the P2_A2 power state 392 and the VR_EN pin may have no meaning). In the P2_A2 power state 392, if the VR_EN pin transitions from low to high, and the register R2F[2] is set to 0, then the signal PWR_GOOD may be set to low, the PMIC 100 may require a power cycle and the PMIC 100 may move remain in the P2_A2 power state 392. In the P2_A2 power state 392, if the VR_EN pin transitions from low to high, the register R2F[2] is set to 1 and the register value 104 is set to 0, then the signal PWR_GOOD may be in a high impedance state, a power cycle may not be needed and the PMIC 100 may move to the P3 power state 386. In the P2_A2 power state 392, if the VR_EN pin transitions from low to high, the register R2F[2] is set to 1, the register R32[5] is set to 0 and the register value 104 is set to 0, then the signal PWR_GOOD may be in a high impedance state, a power cycle may not be needed and the PMIC 100 may move to the P3 power state 386. In the P2_A2 power state 392, if the VR_EN pin transitions from low to high, the register R2F[2] is set to 1, the register R32[5] is set to 1 and the register value 104 is set to 0, then the PMIC 100 may be in an improper configuration.

In the P2_A2 power state 392, if the VR Enable command is on the I²C/I3C bus 90 and the register R2F[2] is set to 0, then the signal PWR_GOOD may be set to low, a power cycle may be needed and the PMIC 100 may remain in the P2_A2 power state 392. In the P2_A2 power state 392, if the VR Enable command is on the I²C/I3C bus 90, the register R2F[2] is set to 1, and the register value 104 is set to 0, then the signal PWR_GOOD may be in a high impedance state, a power cycle may not be needed and the PMIC 100 may move to the P3 power state 386. In the P2_A2 power state 392, if the VR Enable command is on the I²C/I3C bus 90, the register R2F[2] is set to 1, and the register value 104 is set to 1, then the signal PWR_GOOD may be in a high impedance state, a power cycle may not be needed and the PMIC 100 may move to the P3 power state 386.

In the P2_A2 power state 392, if there is an internal VR Disable event and the register R2F[2] is set to 0, then there may be no change and a power cycle may be needed. In the P2_A2 power state 392, if there is an internal VR Disable event and the register R2F[2] is set to 1, then there may be no change and a power cycle may not be needed. In the P2_A2 power state 392, if the signal VIN_BULK is invalid then the PMIC 100 may move to the P0 power state 382.

The P1 power state 388 may be the quiescent power state. In the quiescent power state 388, the signal VIN_BULK may be a nominal 5V and there may be a current requirement of 25 µA. In the quiescent power state 388, all the circuits in the PMIC 100, including the switch regulators 106a-106c and the LDO regulators 106d-106e may be off. In the quiescent power state 388, the signal VR_EN may be at a static low or high level. In the quiescent power state 388, the I²C/I3C interface access may not be allowed (e.g., access to the bus 90 may be disabled) and may be pulled high and the signal PID may be at a static low or high level. The quiescent power state 388 may only be applicable if the register value 104 is set to a logical 1 (or high) value. When the PMIC 100 enters the quiescent power state 388, the PMIC 100 may store the settings of the register bits R32 [5], R2F [2] and the register value 104 in non-volatile memory as long as the signal VIN_BULK is valid. In an example, the non-volatile memory may be accessed via the host controller 20. The pin25 for the signal PWR_GOOD may be configured to have bi-directional operation when the PMIC 100 is in the programming mode of operation and in the quiescent power state 388.

The P3/P3a power state 386 may be the idle power state. In the idle power state 386, the signal VIN_BULK may be a nominal 5V and there may be a current requirement of 100 μA. In the idle power state 386, all the circuits in the PMIC 100, including the switch regulators 106a-106c and the LDO regulators 106d-106e may be on with a 0A load. In the idle power state 386, the signal VR_EN may be at a static low or high level. In the idle power state 386, the I²C/I3C interface access may be allowed (e.g., access to the bus 90 may be enabled) but the bus 90 may be pulled high and the signal PID may be at a static low or high level. The idle power state 386 may only be applicable if the register value 104 is set to a logical 0 (or low) value. The P3a power state may be the same state as the P3 power state but with the load on all the switch output regulators 106a-106c and the LDO regulators 106d-106e at 0A. For example, in the quiescent power state 388, the PMIC 100 may consume less power than when in the idle power state 386.

The register 102i may be a power state entry register. The power state entry register 102i may be the R1A register. The power state entry register R1A may comprise 8 bits (e.g., eight storage locations). One of the storage locations (e.g., R1A[4]) may be the register value 104. The R1A register may be configured to control entry into the quiescent (e.g., low) P1 power state 388.

The [0] bit of the register R1A may be a VOUT_1.0V_POWER_GOOD_THRESHOLD_VOLTAGE storage location that may provide the VOUT_1.0V LDO output threshold voltage for Power Good status. In an example, a value of 0 for the [0] bit of the register R1A may be −10% from the setting of the register R51[2:1] and a value of 1 may be −15% from the setting of the register R51[2:1].

The [1] bit of the register R1A may be a OUTPUT POWER SELECT storage location that may provide the switch output power select (e.g., only applicable if the register R1B[6] is set to 1). In an example, a value of 0 for the [1] bit of the register R1A may report the individual power for each rail on R0C, R0E and R0F and a value of 1 may report the total power on each rail in R0C.

The [2] bit of the register R1A may be a VOUT_1.8_POWER_GOOD_THRESHOLD_VOLTAGE storage location that may provide the LDO output threshold voltage for the power good status. In an example, a value of 0 for the [2] bit of the register R1A may indicate a voltage of 1.6V and a value of 1 may be reserved. The [3] bit of the register R1A may be reserved.

The [4] bit of the register R1A may be the register value 104. The register value 104 may be a QUIESCENT_STATE_EN storage location that may provide an enable bit for the entry into the quiescent power state 388. The register value 104 must be configured before issuing the VR Enable command. In an example, a value of 0 for the register value 104 disable the quiescent power state 388 and a value of 1 may enable the quiescent power state 388 (e.g., the VR Disable command (e.g., the VR_EN pin transition to low or the register R32[7] set to 0 in the programmable mode only) may put the PMIC 100 in the quiescent power state 388).

The [5] bit of the register R1A may be a VIN_BULK POWER_GOOD_THRESHOLD_VOLTAGE storage location that may provide a VIN_BULK input supply (falling) threshold voltage for power good status. In an example, a value of 0 for the [5] bit of the register R1A may indicate a voltage of 4.0V and a value of 1 for the [5] bit of the register R1A may indicate a voltage of 3.75V. The [6:7] bits of the register R1A may be reserved.

The default value for bits of the register R1A may be 0. In an example, by default the register value 104 may be a 0 value. With the 0 value for the register value 104, the PMIC 100 may disable the quiescent power state 388 (e.g., the PMIC 100 may not enter the quiescent power state 388). The register value 104 may be changed to a value of 1 to enable the quiescent power state 388. The register value 104 may be changed by a command from the host controller 20. In one example, the command from the host controller 20 to change the register value 104 may be a transition of the signal VR_EN. In another example, the command from the host controller 20 to change the register value 104 may be a VR Enable command or a VR Disable command on the bus 90.

In some embodiments, the host controller interface (e.g., the pins pin1-pin28) for the PMIC 100 may be defined by the DDR5 specification. Each of the pins pin1-pin28 may have particular functions. The signal VR_EN may have pre-defined functionality. The PMIC 100 may add to the pre-defined functionality of the pin pin28. For example, the PMIC 100 may reuse the pin pin28 and the register value 104 to control entry to and exit from the quiescent power state 388. The PMIC 100 may be configured to work within the requirements of the DDR5 specification (and later generations) to add the functionality of the quiescent power state 388. The combination of the pin pin28 for the signal VR_EN and the register value 104 to control entry to and exit from the quiescent power state 388 may enable the PMIC 100 to control a status of the regulators 106a-106n without increasing the number of pins pin1-pin28 of the host controller interface of the PMIC 100.

Figure 8:
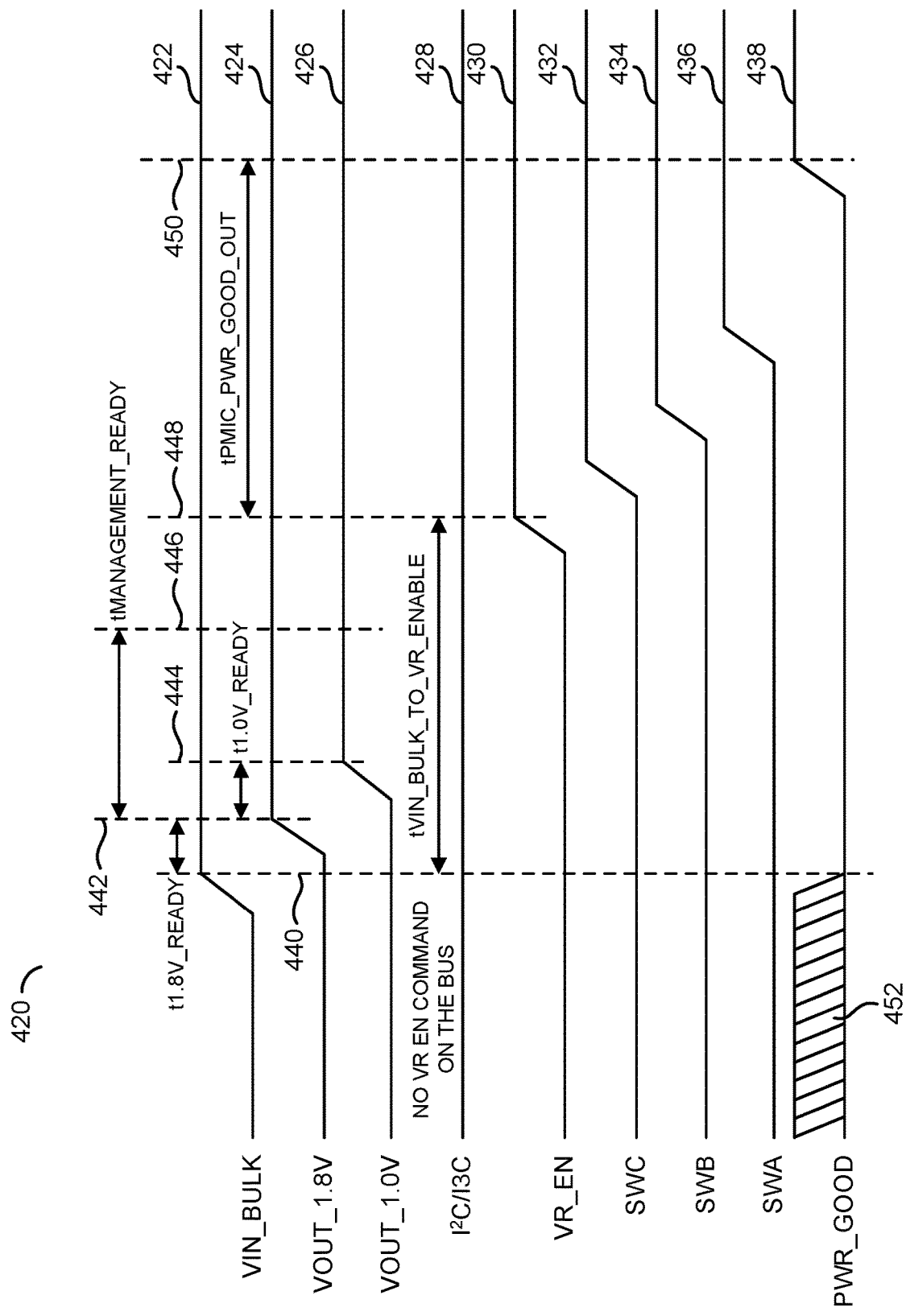
FIG. 8 is a timing diagram illustrating a power up sequence when the VR_EN pin is high after VIN_Bulk ramp and no bus command.

Referring to FIG. 8, a timing diagram illustrating a power up sequence when the VR_EN pin is high after VIN_Bulk ramp and no bus command is shown. A timing chart 420 is shown. The timing chart 420 may comprise waveforms 422-438. The waveform 422 may represent the signal VIN_BULK. The waveform 424 may represent the signal VOUT_1.8V. The waveform 426 may represent the signal VOUT_1.0V. The waveform 428 may represent commands on the I²C/I3C bus 90. The waveform 430 may represent the signal VR_EN. The waveform 432 may represent the signal SWC. The waveform 434 may represent the signal SWB. The waveform 436 may represent the signal SWA. The waveform 438 may represent the signal PWR_GOOD.

Vertical lines 440-450 are shown. The vertical lines 440-450 may correspond to particular timings and/or responses by the PMIC 100. In an example, the vertical lines 440 may represent a sequence of events and/or actions. The vertical line 440 may correspond to the transition of the VIN_BULK waveform 422 from low to high. The vertical line 442 may correspond to the transition of the VOUT_1.8V waveform 424 from low to high. The time between the line 440 and the line 442 may be t1.8V_READY. The vertical line 444 may correspond to the transition of the VOUT_1.0V waveform 426 from low to high. The time between the line 442 and the line 444 may be t1.0V_READY.

The line 448 may correspond to the transition of the VR_EN waveform 430 from low to high. The line 446 may be before the line 448. The time between the line 442 and the line 446 may be tMANAGEMENT_READY. The time between the line 440 and the line 448 may be tVIN_BULK_TO_VR_ENABLE. There may be no VR Enable command on the I²C/I3C bus 90.

At the time 448, the SWC waveform 432 may transition from low to high, then the SWB waveform 434 may transition from low to high, then the SWA waveform 436 may transition from low to high and then the PWR_GOOD waveform 438 may transition from low to high. For example, changing the VR_EN waveform 430 (e.g., providing an input) may change a status of the regulators 106a-106n. The PWR_GOOD waveform 438 may be in an indeterminate state 452 before the time 440. The line 450 may correspond to the transition of the PWR_GOOD waveform from low to high. The time between the line 448 and the line 450 may be tPMIC_PWR_GOOD_OUT.

The signal VIN_BULK (e.g., the signal VIN_BULK_A, the signal VIN_BULK_B and the signal VIN_BULK_C) may be the one input supply for the PMIC 100. The input supply may be received from the host platform (e.g., host controller 20). The VIN_BULK supply may be used by the PMIC 100 for all three switch output regulators 106a-106c and the two LDO output regulators 106d-106e. The signal VOUT_1.8V (e.g., LDO output) may be separate and independent from the signal SWC (e.g., switch output that may be for the DRAM VPP rail). The signal VOUT_1.0V (e.g., LDO output) may be separate and independent from the signal SWA or SWB.

When the PMIC 100 is powered on, the VIN_BULK supply may reach a minimum threshold voltage of approximately 4.25V before being detected as valid to the PMIC 100. After the VIN_BULK supply reaches the minimum threshold voltage, the PMIC 100 may update the register R08[7] when the signal VIN_BULK drops below the threshold setting in the [5] bit of the register R1A.

Once the VIN_BULK supply is valid (e.g., at the time 440), the PWR_GOOD waveform 438 may transition from the indeterminate state 452 to the low value and the PMIC 100 may drive the VOUT_1.8V waveform 424 high (e.g., within t1.8V_READY) and the VOUT_1.0V waveform 426 high (e.g., within t1.0V_READY). The PMIC 100 may only drive the signal PWR_GOOD low when the VIN_BULK waveform 422 reaches the minimum threshold voltage. The PWR_GOOD waveform 438 may be pulled up (e.g., from 1.8V to 3.3V) on either the platform or on the host controller 20. The pullup voltage of the waveform PWR_GOOD 438 may be available only after the signal VIN_BULK is valid and stable. The PMIC 100 may enable the I²C/I3C bus 90 interface function within the time tMANAGEMENT_READY. The host 20 may not attempt to access the registers 102a-102n until the tMANAGEMENT_READY timing requirement is satisfied.

During power on, the host 20 may ramp up the VIN_BULK waveform 422, hold the VIN_BULK waveform 422 stable for a minimum amount of time of tVIN_VULK_TO_VR_ENABLE, and hold the VR_EN pin to a static low or high. Generally, there may not be a timing relationship requirement on the VR_EN waveform 430 as long as the VR_EN waveform 430 is held to static level (either low or high). During the ramp up of the VIN_BULK waveform 422, if the VR_EN waveform 430 is held low, the VR_EN waveform 430 may only transition to high once. The VR_EN waveform 430 may not be allowed to transition low during the ramp up of the VIN_BULK waveform 422 once high. If the VR_EN waveform 430 is held high or transitions to high during the ramp up of the VIN_BULK waveform 422, the PMIC 100 may turn on the output rails. If the VR_EN waveform 430 is held low during the ramp up of the VIN_BULK waveform 422, the host 20 may assert the signal VR_EN high to turn on the PMIC 100 output rails. The host 20 may issue the VR Enable command by setting the register R32[7] to 1 via the I²C/I3C bus 90 to turn on the PMIC 100 output rails. The example power up initialization sequences shown in association with FIGS. 8-12 may be representative examples. The particular ramp up sequence may be configurable through the registers 102a-102n that correspond to the power on sequence configuration.

After the VR Enable command is registered on the I²C/I3C bus 90 or the signal VR_EN is registered high, the PMIC 100 may perform a number of steps within the time tPMIC_PWR_GOOD_OUT. The PMIC 100 may check that the power good status of the VIN_BULK waveform 422 is valid. The PMIC 100 may power up using the power on sequence configurations (e.g., described by the register R40 and/or the register R42) and configure the internal registers 102a-102n as programmed in the DIMM vendor memory space registers. The PMIC 100 may then power up all enabled output switch regulators 106a-106c to be ready for normal operation. The PMIC 100 may then update the status registers (e.g., R08) and float the PWR_GOOD waveform 438 within the time tPMIC_PWR_GOOD_OUT. If the PWR_GOOD waveform 438 is not floated within the time tPMIC_PWR_GOOD_OUT, the host 20 may access the status registers of the PMIC 100 for detailed information. The PMIC 100 may not acknowledge any requests from the host 20 on the I²C/I3C bus 90 after the VR Enable command until the time tPMIC_PWR_GOOD_OUT expires.

Figure 9:
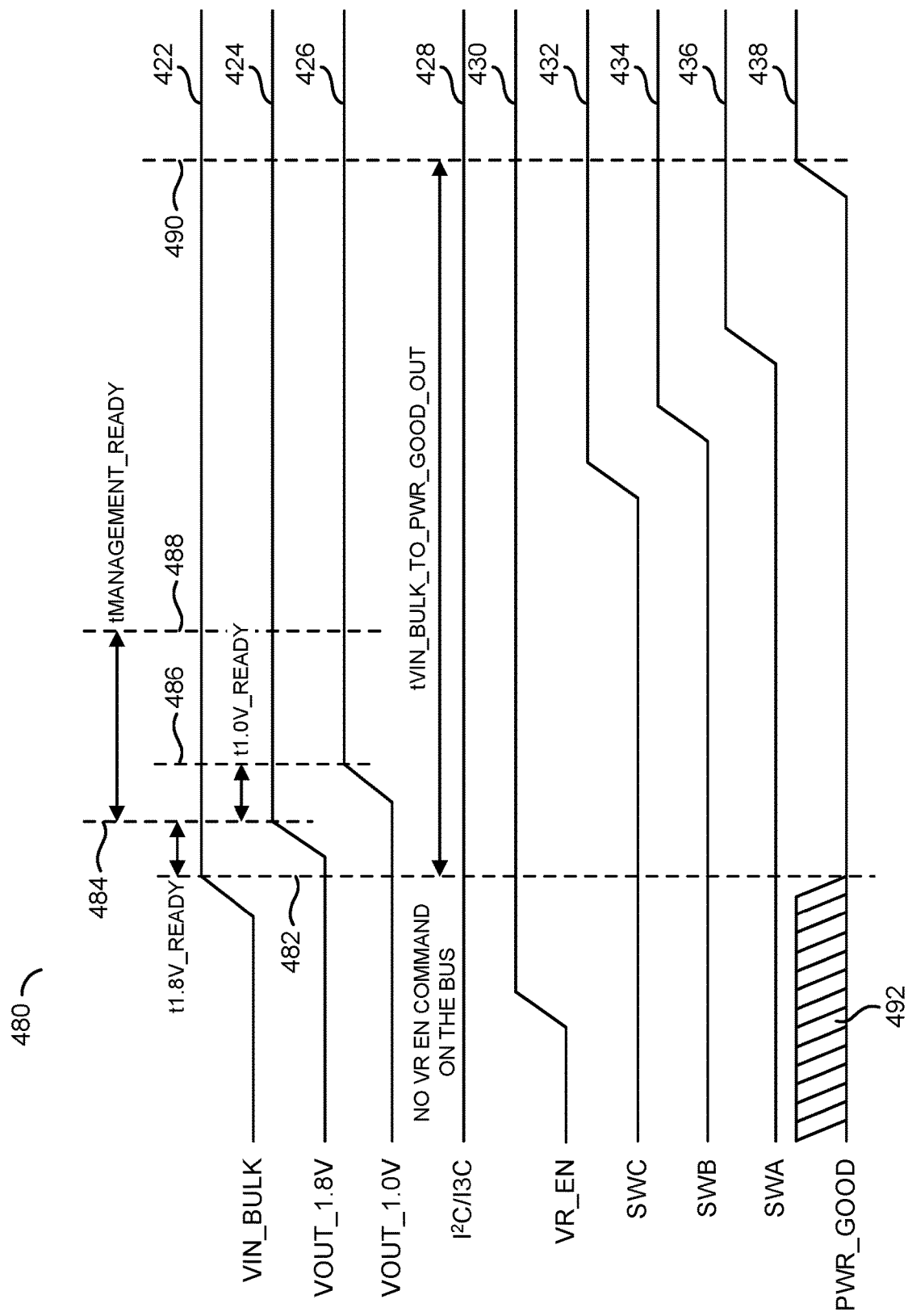
FIG. 9 is a timing diagram illustrating a power up sequence when the VR_EN pin is high before VIN_Bulk ramp and no bus command.

Referring to FIG. 9, a timing diagram illustrating a power up sequence when the VR_EN pin is high before VIN_Bulk ramp and no bus command is shown. A timing chart 480 is shown. The timing chart 480 may comprise waveforms 422-438. The waveforms 422-438 may be similar to the waveforms 422-438 shown in association with FIG. 8.

Vertical lines 482-490 are shown. The vertical lines 482-490 may correspond to particular timings and/or responses by the PMIC 100. The vertical line 482 may correspond to the transition of the VIN_BULK waveform 422 from low to high. The vertical line 484 may correspond to the transition of the VOUT_1.8V waveform 424 from low to high. The time between the line 482 and the line 484 may be t1.8V_READY. The vertical line 486 may correspond to the transition of the VOUT_1.0V waveform 426 from low to high. The time between the line 484 and the line 486 may be t1.0V_READY.

The transition of the VR_EN waveform 430 from low to high may occur before the time 482 (e.g., before the ramp up of the VIN_BULK waveform 422). The line 488 may be after the line 486. The time between the line 484 and the line 488 may be tMANAGEMENT_READY. The line 490 may correspond to the transition of the PWR_GOOD waveform 438 from low to high (and after the transition of the SWC waveform 432 from low to high, the transition of the SWB waveform 434 from low to high and the transition of the SWA waveform 436 from low to high). The PWR_GOOD waveform 438 may be in an indeterminate state 492 before the time 482 (e.g., before the VIN_BULK ramp up). The time between the time 482 and the time 490 may be tVIN_BULK_TO_PWR_GOOD_OUT. There may be no VR Enable command on the I²C/I3C bus 90.

Figure 10:
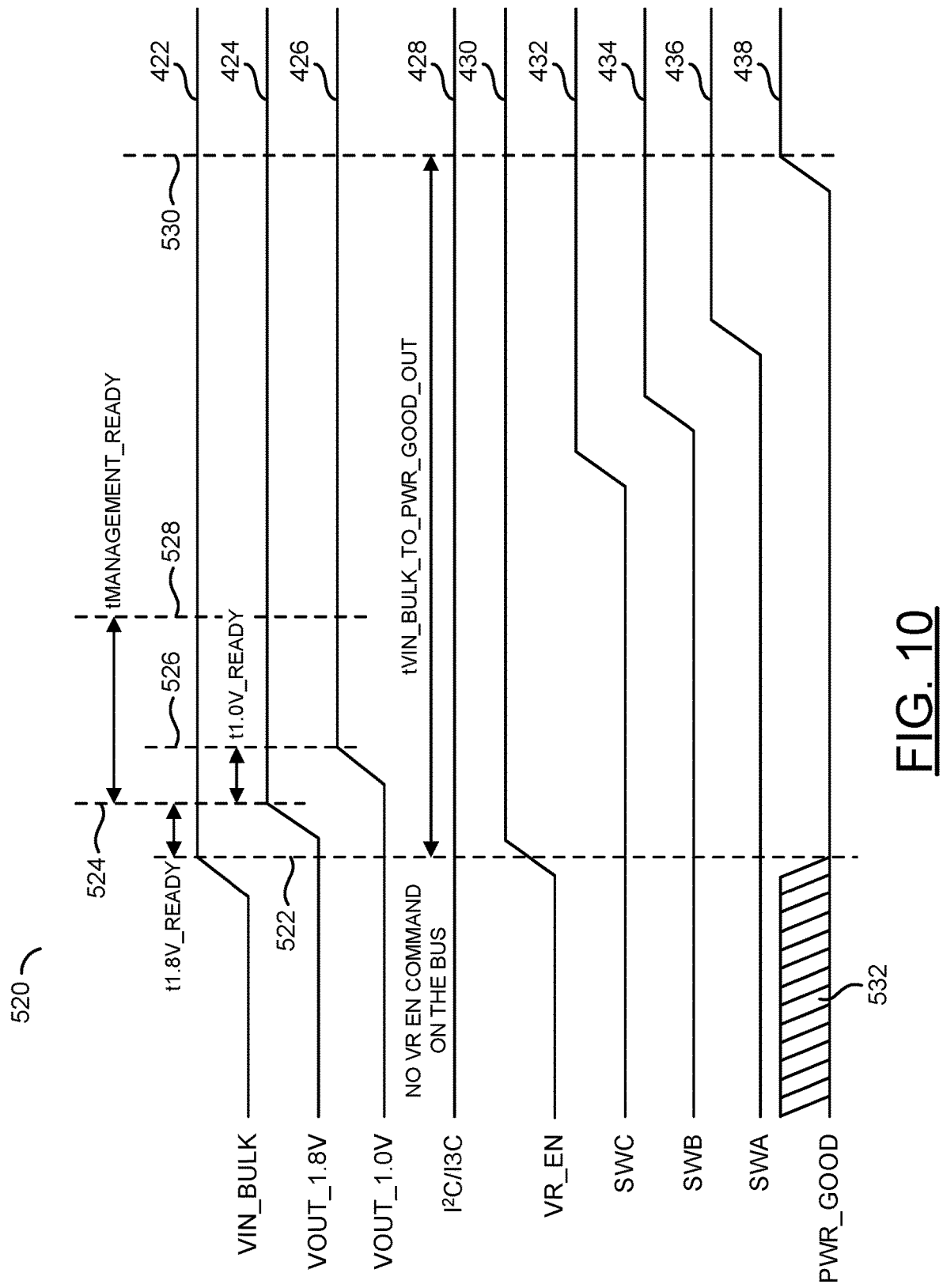
FIG. 10 is a timing diagram illustrating a power up sequence when the VR_EN pin is high during VIN_Bulk ramp and no bus command.

Referring to FIG. 10, a timing diagram illustrating a power up sequence when the VR_EN pin is high during VIN_Bulk ramp and no bus command is shown. A timing chart 520 is shown. The timing chart 520 may comprise waveforms 422-438. The waveforms 422-438 may be similar to the waveforms 422-438 shown in association with FIG. 8.

Vertical lines 522-530 are shown. The vertical lines 522-530 may correspond to particular timings and/or responses by the PMIC 100. The vertical line 522 may correspond to the transition of the VIN_BULK waveform 422 from low to high. The vertical line 524 may correspond to the transition of the VOUT_1.8V waveform 424 from low to high. The time between the line 522 and the line 524 may be t1.8V_READY. The vertical line 526 may correspond to the transition of the VOUT_1.0V waveform 426 from low to high. The time between the line 524 and the line 526 may be t1.0V_READY.

The transition of the VR_EN waveform 430 from low to high may occur at the time 522 (e.g., during the ramp up of the VIN_BULK waveform 422). The line 528 may be after the line 526. The time between the line 524 and the line 528 may be tMANAGEMENT_READY. The line 530 may correspond to the transition of the PWR_GOOD waveform 438 from low to high (and after the transition of the SWC waveform 432 from low to high, the transition of the SWB waveform 434 from low to high and the transition of the SWA waveform 436 from low to high). The PWR_GOOD waveform 438 may be in an indeterminate state 532 before the time 522 (e.g., before the VIN_BULK ramp up). The time between the time 522 and the time 530 may be tVIN_BULK_TO_PWR_GOOD_OUT. There may be no VR Enable command on the I²C/I3C bus 90.

Figure 11:
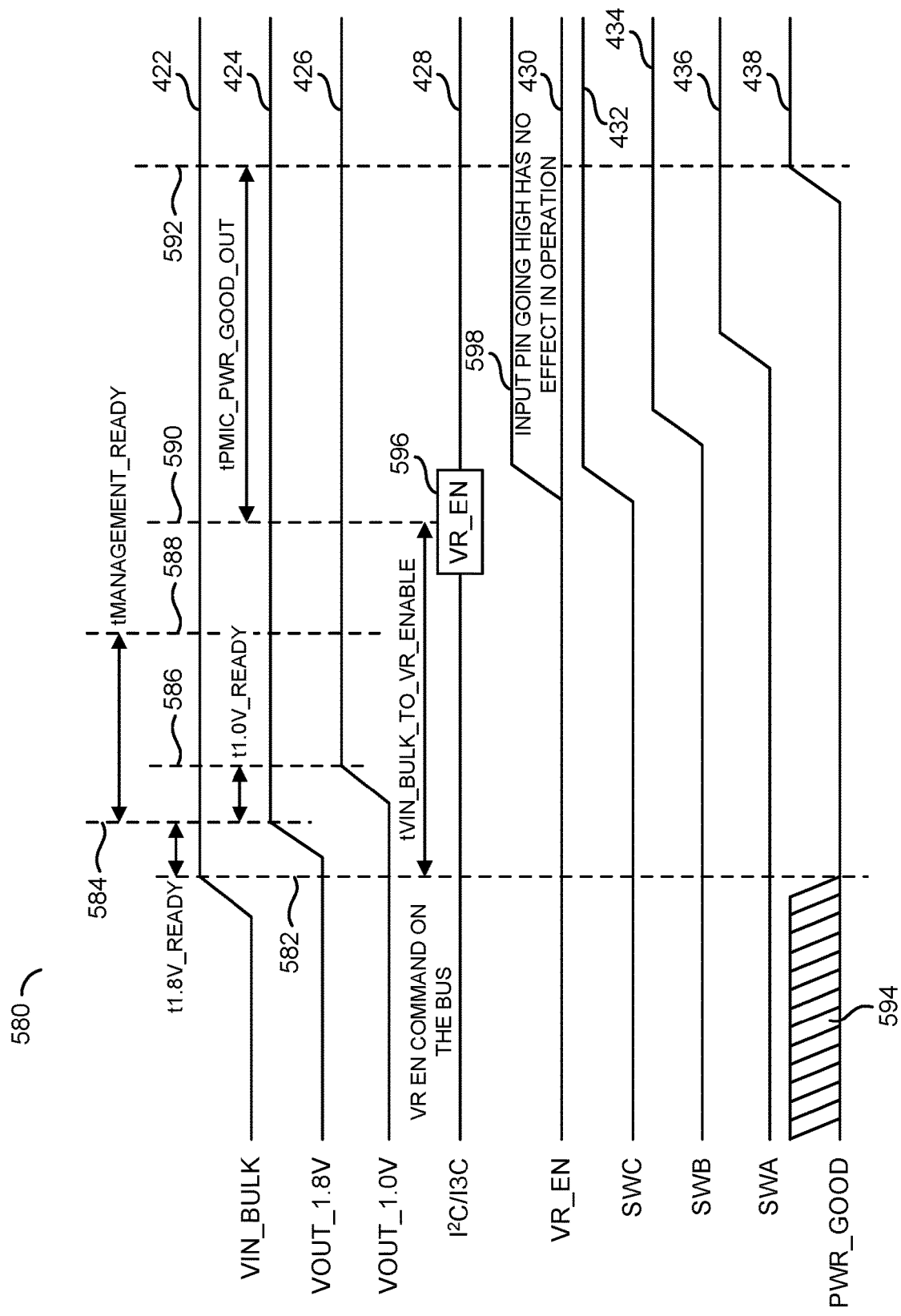
FIG. 11 is a timing diagram illustrating a power up sequence for the PMIC with a bus command.

Referring to FIG. 11, a timing diagram illustrating a power up sequence for the PMIC with a bus command is shown. A timing chart 580 is shown. The timing chart 580 may comprise waveforms 422-438. The waveforms 422-438 may be similar to the waveforms 422-438 shown in association with FIG. 8.

Vertical lines 582-592 are shown. The vertical lines 582-592 may correspond to particular timings and/or responses by the PMIC 100. The vertical line 582 may correspond to the transition of the VIN_BULK waveform 422 from low to high. The vertical line 584 may correspond to the transition of the VOUT_1.8V waveform 424 from low to high. The time between the line 582 and the line 584 may be t1.8V_READY. The vertical line 586 may correspond to the transition of the VOUT_1.0V waveform 426 from low to high. The time between the line 584 and the line 586 may be t1.0V_READY.

The line 588 may be after the line 586. The time between the line 584 and the line 588 may be tMANAGEMENT_READY. The line 590 may correspond to a VR Enable command 596 on the I²C/I3C bus 90. The VR Enable command 596 may be asserted after the ramp up of the VIN_BULK waveform 422. After the VR Enable command 596, the transition of the SWC waveform 432 may be from low to high, the transition of the SWB waveform 434 may be from low to high and the transition of the SWA waveform 436 may be from low to high. The PWR_GOOD waveform 438 may transition from low to high after the VR Enable command 596 and the transition of the waveforms 432-436 at the time 592. The PWR_GOOD waveform 438 may be in an indeterminate state 594 before the time 582 (e.g., before the VIN_BULK ramp up). The time between the time 582 and the time 590 may be tVIN_BULK_TO_VR_ENABLE. The time between the time 590 and the time 592 may be tPMIC_PWR_GOOD_OUT. A section 598 of the VR_EN waveform 430 is shown after the VR Enable command 596. After the VR Enable command 596, the VR_EN pin going to high may have no effect on the operation of the PMIC 100.

Figure 12:
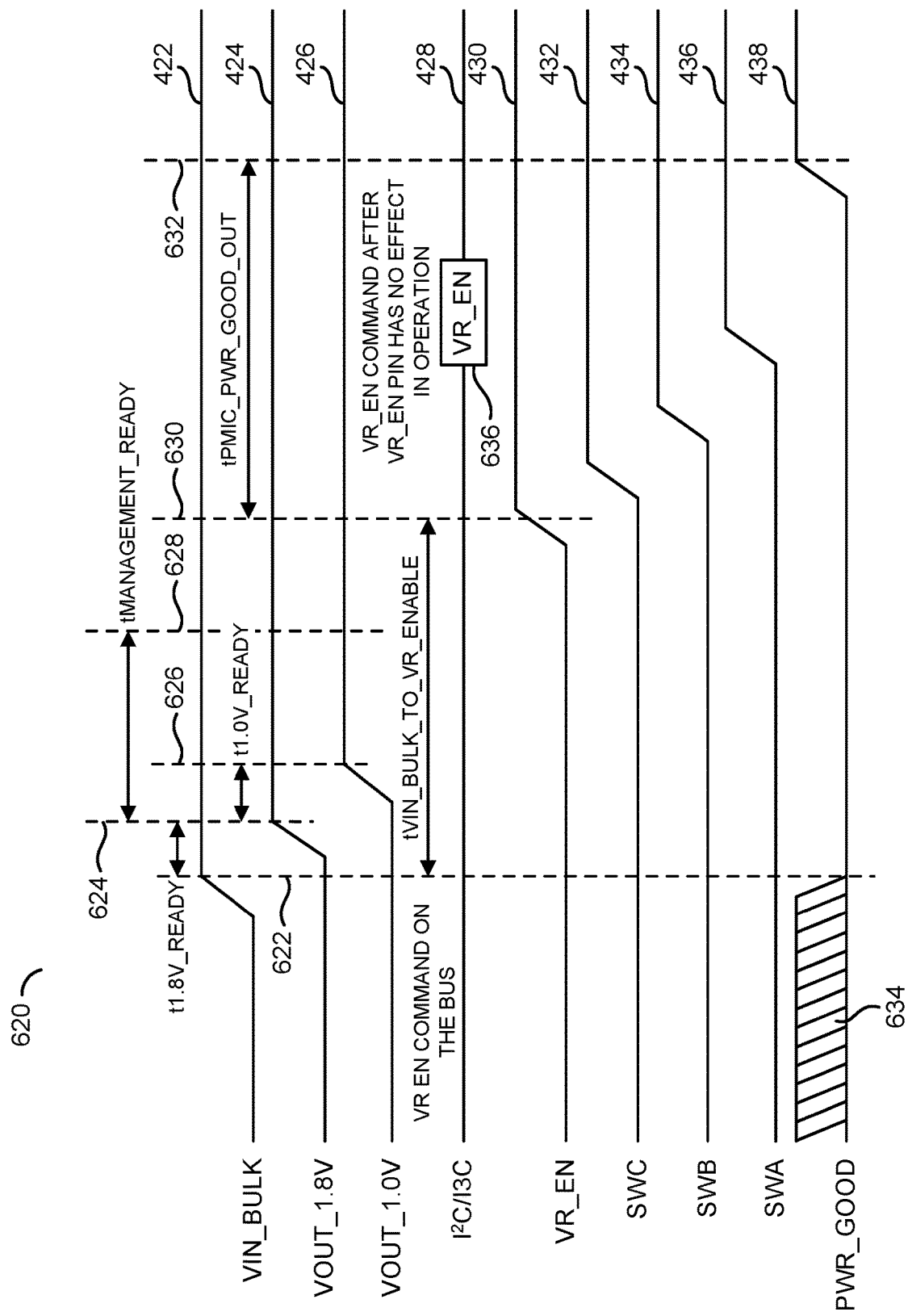
FIG. 12 is a timing diagram illustrating a power down sequence when the VR_EN pin is high with the low power state register at a low value in the program mode of operation.

Referring to FIG. 12, a timing diagram illustrating a power down sequence when the VR_EN pin is high with the low power state register at a low value in the program mode of operation is shown. A timing chart 620 is shown. The timing chart 620 may comprise waveforms 422-438. The waveforms 422-438 may be similar to the waveforms 422-438 shown in association with FIG. 8.

Vertical lines 622-632 are shown. The vertical lines 622-632 may correspond to particular timings and/or responses by the PMIC 100. The vertical line 622 may correspond to the transition of the VIN_BULK waveform 422 from low to high. The vertical line 624 may correspond to the transition of the VOUT_1.8V waveform 424 from low to high. The time between the line 622 and the line 624 may be t1.8V_READY. The vertical line 626 may correspond to the transition of the VOUT_1.0V waveform 426 from low to high. The time between the line 624 and the line 626 may be t1.0V_READY.

The line 628 may be after the line 586. The time between the line 624 and the line 628 may be tMANAGEMENT_READY. The line 630 may correspond to the transition of the VR_EN waveform 430 from low to high. The VR_EN waveform 430 may transition to high after the ramp up of the VIN_BULK waveform 422. After the time 630, the SWC waveform 432 may transition from low to high, the SWB waveform 434 may transition from low to high and the SWA waveform 436 may transition from low to high. The PWR_GOOD waveform 438 may transition from low to high after the time 630 and the transition of the waveforms 432-436 at a line 632. The PWR_GOOD waveform 438 may be in an indeterminate state 634 before the time 622 (e.g., before the VIN_BULK ramp up). The time between the time 622 and the time 630 may be tVIN_BULK_TO_VR_ENABLE. The time between the time 630 and the time 632 may be tPMIC_PWR_GOOD_OUT. A VR Enable command 636 is shown after the time 630 that the VR_EN waveform 430 is asserted high. The VR Enable command 636 may have no effect on the operation of the PMIC 100 after the signal VR_EN pin is asserted.

Figure 13:
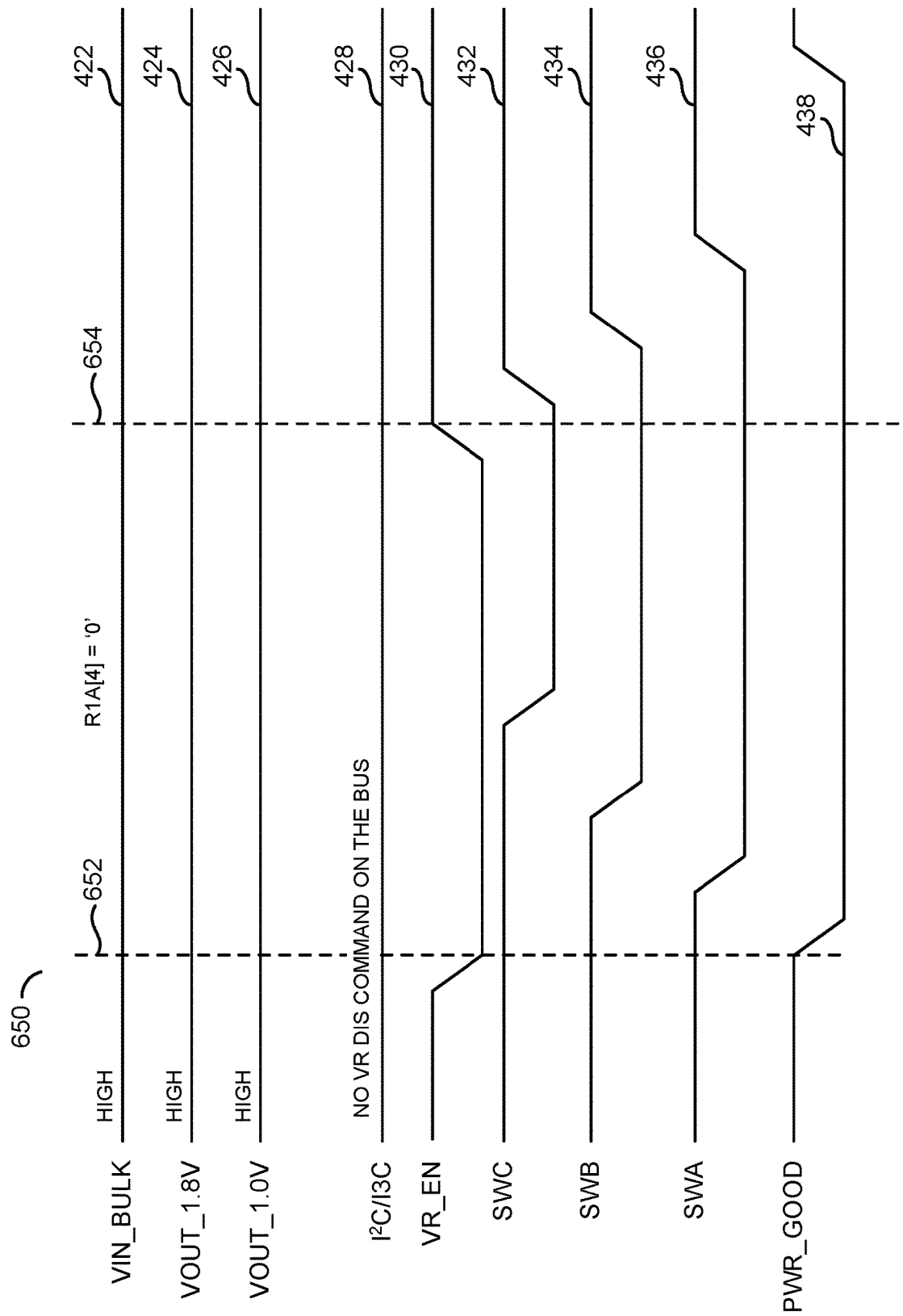
FIG. 13 is a timing diagram illustrating a power down sequence when the VR_EN pin is low with the low power state register at a low value in the program mode of operation.

Referring to FIG. 13, a timing diagram illustrating a power down sequence when the VR_EN pin is low with the low power state register at a low value in the program mode of operation is shown. A timing chart 650 is shown. The timing chart 650 may comprise waveforms 422-438. The waveforms 422-438 may be similar to the waveforms 422-438 shown in association with FIG. 8.

Vertical lines 652-654 are shown. The vertical lines 652-654 may correspond to particular timings and/or responses by the PMIC 100. The vertical line 652 may correspond to the transition of the VR_EN waveform 430 from high to low. The vertical line 654 may correspond to the transition of the VR_EN waveform 430 from low to high.

The VIN_BULK waveform 422, the VOUT_1.8V waveform 424 and the VOUT_V1.0V waveform 426 may each be at a high value. There may be no VR Disable command on the bus 90. The register value 104 may be set to 0.

After the time 652 when the VR_EN waveform 430 transitions to low, the PWR_GOOD waveform 438 may transition to low. Next, the SWA waveform 436 may transition from high to low, then the SWB waveform 434 may transition from high to low and then the SWC waveform 432 may transition from high to low. For example, changing the VR_EN waveform 430 (e.g., providing an input) may change a status of the regulators 106a-106n. After the time 654, when the VR_EN waveform 430 transitions back to high, the SWC waveform 432 may transition from low to high, then the SWB waveform 434 may transition from low to high, then the SWA waveform 436 may transition from low to high, and then the PWR_GOOD waveform 438 may transition from low to high. For example, changing the VR_EN waveform 430 (e.g., providing an input) may change a status of the regulators 106a-106n.

Regardless of how the regulators 106a-106n are turned on (e.g., using the signal VR_EN or the VR Enable command on the bus 90), the regulators 106a-106n may be powered down based on the mode of operation of the PMIC 100 (e.g., the programmable mode or the secure mode). In the programmable mode of operation, when the register value 104 is set to 0, the PMIC 100 may enable the host 20 to power down any or all of the regulators 106a-106n using three different methods.

In one method, when the PMIC 100 is in the programmable mode of operation and the register value 104 is set to 0, the host 20 may power down the regulators 106a-106n using the VR Disable command (e.g., with the register R32[7] set to 0 or the signal VR_EN transition to low). The PMIC 100 may perform one or more power off sequences according to configurations (e.g., as defined by the register R58 and/or defined by the register R5A) to preserve a voltage relationship as configured in the registers 102a-102n.

In one example, the PMIC 100 may control the signal PWR_GOOD by providing the VR Disable command using the VR_EN pin (e.g., setting the signal VR_EN to low). The PMIC 100 may then assert the signal PWR_GOOD low. The host 20 may re-enable the output regulators 106a-106n by asserting the signal VR_EN as high. The PMIC 100 may execute one or more power on sequences according to the registers 102a-102n and float the signal PWR_GOOD after the timing parameter tPMIC_PWR_GOOD_OUT is satisfied. The PMIC 100 may not need to be power cycled.

In another example, the PMIC 100 may control the signal PWR_GOOD by the host 20 providing the VR Disable command using the bus 90 (e.g., with the register value R32[7] set to 0). The PMIC 100 may keep the signal PWR_GOOD floating because there may not be a fault condition (e.g., the VR Disable command may be an intentional command from the host 20). The host 20 may re-enable the regulators 106a-106n by issuing the VR Enable command on the bus 90 (e.g., with the register value R32[7] set to 1). The PMIC 100 may execute one or more power on sequences according to the registers 102a-102n and continue to float the signal PWR_GOOD until the time tPMIC_PWR_GOOD_OUT. Then the PMIC 100 may assume normal control of the signal PWR_GOOD (e.g., as shown in association with FIG. 14).

Generally, the simultaneous usage of the signal VR_EN and the VR Enable (or VR Disable) command on the bus 90 may not be allowed. For example, if the signal VR_EN transitions low first, then the signal PWR_GOOD may follow to low and remain low even if there is a subsequent command on the bus 90.

In another method for controlling the power down of the regulators 106a-106n, the PMIC 100 may configure one or more bits of the registers 102a-102n (e.g., bits [6,4:3] of the register R2F) in any specific sequence desired by the host controller 20. The PMIC 100 may not execute the power off sequences without an instruction from the host 20. The PMIC 100 may keep the signal PWR_GOOD floating because the power down may be an intentional command from the host 20 (e.g., not a fault condition). The host 20 may re-enable any of the regulators 106a-106n that have been disabled by configuring one or more bits of the registers 102a-102n (e.g., [6,4:3] of the register R2F) in any specific sequence desired by the host 20.

In yet another method for controlling the power down of the regulators 106a-106n, the registers 102a-102n (e.g., the register R32[5] set to 1) may drive the signal PWR_GOOD low. The PMIC 100 may execute one or more power down sequences according to the registers 102a-102n to preserve the voltage relationship as configured by the registers 102a-102n and drive the signal PWR_GOOD low. The PMIC 100 may preserve the contents of all the registers 102a-102n (e.g., including MTP error log registers). The host 20 may re-enable the regulators 106a-106n by issuing the VR Enable command on the bus 90 and the PMIC 100 may execute one or more power on sequences and float the signal PWR_GOOD after the tPMIC_PWR_GOOD timing parameter is satisfied. The PMIC 100 may not require a power cycle.

The PMIC 100 may be configured to generate an internal VR Disable command at any time in response to one or more events. The PMIC 100 may execute one or more power off sequences according to the registers 102a-102n to preserve the voltage relationship as configured in the registers 102a-102n. The PMIC 100 may then assert the signal PWR_GOOD low. The host 20 may re-enable the regulators 106a-106n with the VR Enable command (via the signal VR_EN or the bus 90) and the PMIC 100 may float the PWR_GOOD signal. The PMIC 100 may not require a power cycle.

Figure 14:
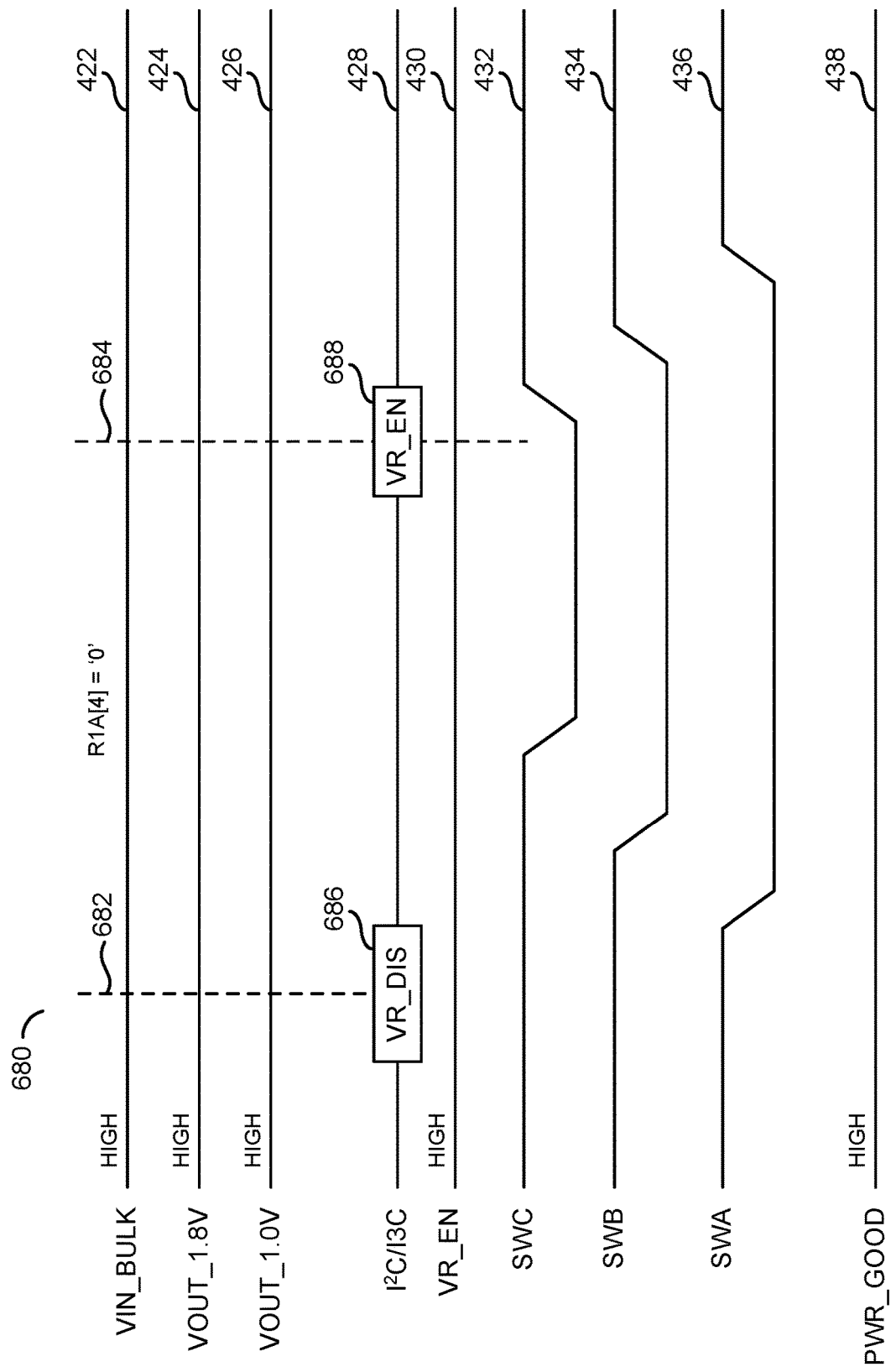
FIG. 14 is a timing diagram illustrating a power down sequence when the VR_EN pin is high with the low power state register at a high value in the program mode of operation.

Referring to FIG. 14, a timing diagram illustrating a power down sequence when the VR_EN pin is high with the low power state register at a high value in the program mode of operation is shown. A timing chart 680 is shown. The timing chart 680 may comprise waveforms 422-438. The waveforms 422-438 may be similar to the waveforms 422-438 shown in association with FIG. 8.

Vertical lines 682-684 are shown. The vertical lines 682-684 may correspond to particular timings and/or responses by the PMIC 100. The vertical line 682 may correspond to a VR Disable command on the bus 90. The vertical line 684 may correspond to a VR Enable command on the bus 90.

The VIN_BULK waveform 422, the VOUT_1.8V waveform 424 and the VOUT_V1.0V waveform 426 may each be at a high value. The VR_EN waveform 430 may be held at a static high value. The register value 104 may be set to 0.

After the time 682 when the VR Disable command 686 is provided on the bus 90, the SWA waveform 436 may transition from high to low, then the SWB waveform 434 may transition from high to low and then the SWC waveform 432 may transition from high to low. After the time 684, when the VR Enable command 688 is provided on the bus 90, the SWC waveform 432 may transition from low to high, then the SWB waveform 434 may transition from low to high and then the SWA waveform 436 may transition from low to high (e.g., the switching regulators 106a-106c may be powered back on). The PWR_GOOD waveform 438 may be held high regardless of the VR Disable command 686 and the VR Enable command 688.

Figure 15:
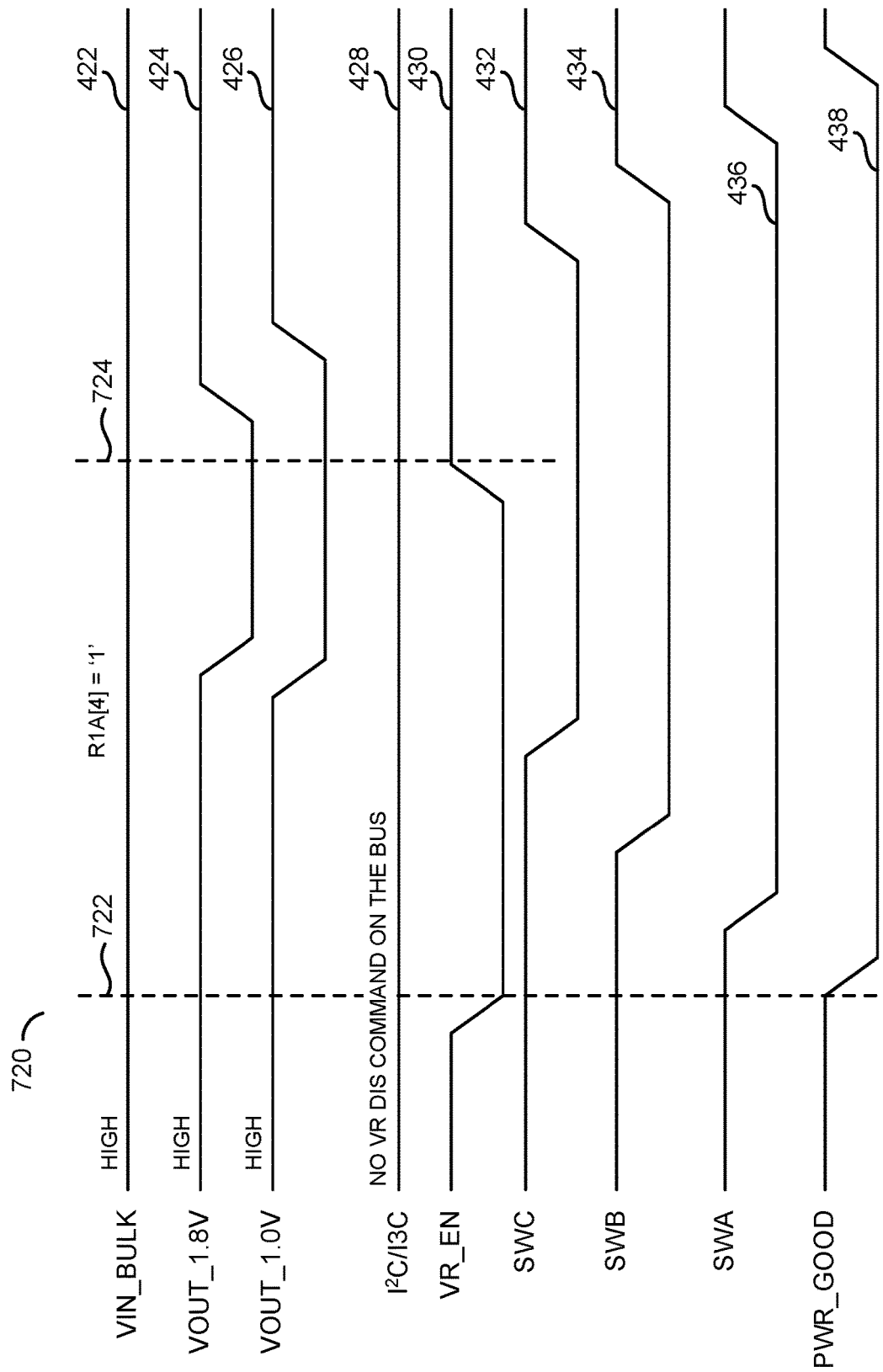
FIG. 15 is a timing diagram illustrating a power down sequence when the VR_EN pin is low with the low power state register at a high value in the program mode of operation.

Referring to FIG. 15, a timing diagram illustrating a power down sequence when the VR_EN pin is low with the low power state register at a high value in the program mode of operation is shown. A timing chart 720 is shown. The timing chart 720 may comprise waveforms 422-438. The waveforms 422-438 may be similar to the waveforms 422-438 shown in association with FIG. 8.

Vertical lines 722-724 are shown. The vertical lines 722-724 may correspond to particular timings and/or responses by the PMIC 100. The vertical line 722 may correspond to the transition of the VR_EN waveform 430 from high to low. The vertical line 724 may correspond to the transition of the VR_EN waveform 430 from low to high.

The VIN_BULK waveform 422, the VOUT_1.8V waveform 424 and the VOUT_V1.0V waveform 426 may each be at a high value. There may be no VR Disable command on the bus 90. The register value 104 may be set to 1.

After the time 722 when the VR_EN waveform 430 transitions to low, the PWR_GOOD waveform 438 may transition from high to low. Next, the SWA waveform 436 may transition from high to low, then the SWB waveform 434 may transition from high to low and then the SWC waveform 432 may transition from high to low. After the SWC waveform 432 transitions from high to low, then the VOUT_1.8V waveform 424 and the VOUT_1.0V waveform 426 may transition from high to low and the VIN_BULK waveform 422 may stay high.

At the time 724, the VR_EN waveform 430 may transition from low to high. After the time 724, when the VR_EN waveform 430 transitions back to high, the VOUT_1.8V waveform 424 may transition from low to high and then the VOUT_1.0V waveform 426 may transition from low to high. Next, the SWC waveform 432 may transition from low to high, then the SWB waveform 434 may transition from low to high, then the SWA waveform 436 may transition from low to high, and then the PWR_GOOD waveform 438 may transition from low to high.

Regardless of how the regulators 106a-106n are turned on (e.g., using the signal VR_EN or the VR Enable command on the bus 90), the regulators 106a-106n may be powered down based on the mode of operation of the PMIC 100 (e.g., the programmable mode or the secure mode). In the programmable mode of operation, when the register value 104 is set to 1, the PMIC 100 may enable the host 20 to power down any or all of the regulators 106a-106n using three different methods.

In one method, when the PMIC 100 is in the programmable mode of operation and the register value 104 is set to 1, the host 20 may power down the regulators 106a-106n using the VR Disable command (e.g., with the register R32[7] set to 0 or the signal VR_EN transition to low). The PMIC 100 may perform one or more power off sequences according to configurations (e.g., as defined by the register R58 and/or defined by the register R5A) to preserve a voltage relationship as configured in the registers 102a-102n. The PMIC 100 may enter the quiescent P1 power state 388.

In one example, the PMIC 100 may control the signal PWR_GOOD by providing the VR Disable command using the VR_EN pin (e.g., setting the signal VR_EN to low). The PMIC 100 may then assert the signal PWR_GOOD low. The host 20 may re-enable the output regulators 106a-106n by asserting the signal VR_EN as high. The PMIC 100 may exit the quiescent P1 power state 388 (e.g., move to the idle P3 power state 386). The PMIC 100 may execute one or more power on sequences according to the registers 102a-102n and float the signal PWR_GOOD after the timing parameter tPMIC_PWR_GOOD_OUT plus additional timing parameters are satisfied as shown in the timing diagram 720. The PMIC 100 may not need to be power cycled.

In another example, the PMIC 100 may control the signal PWR_GOOD by the host 20 providing the VR Disable command using the bus 90 (e.g., with the register value R32[7] set to 0). The PMIC 100 may keep the signal PWR_GOOD floating because there may not be a fault condition (e.g., the VR Disable command may be an intentional command from the host 20). The PMIC 100 may exit the quiescent P1 power state 388 with only the transition of the signal VR_EN to high. The host 20 may re-enable the regulators 106a-106n by asserting the signal VR_EN to high. Then, the PMIC 100 may execute one or more power on sequences according to the registers 102a-102n and continue to float the signal PWR_GOOD until the time tPMIC_PWR_GOOD_OUT plus additional timing parameters. Then the PMIC 100 may assume normal control of the signal PWR_GOOD (e.g., as shown in association with FIG. 16).

Generally, the simultaneous usage of the signal VR_EN and the VR Enable (or VR Disable) command on the bus 90 may not be allowed. For example, if the signal VR_EN transitions low first, then the signal PWR_GOOD may follow to low and remain low even if there is a subsequent command on the bus 90.

In another method for controlling the power down of the regulators 106a-106n, the PMIC 100 may configure one or more bits of the registers 102a-102n (e.g., bits [6,4:3] of the register R2F to 0) in any specific sequence desired by the host controller 20. The PMIC 100 may not execute the power off sequences without an instruction from the host 20. The PMIC 100 may keep the signal PWR_GOOD floating because the power down may be an intentional command from the host 20 (e.g., not a fault condition). The host 20 may re-enable any of the regulators 106a-106n that have been disabled by configuring one or more bits of the registers 102a-102n (e.g., [6,4:3] of the register R2F to 1) in any specific sequence desired by the host 20. The behavior of the signal PWR_GOOD may be shown in association with FIG. 16.

In yet another method for controlling the power down of the regulators 106a-106n, the registers 102a-102n (e.g., the register R32[5] set to 1) may drive the signal PWR_GOOD low. The PMIC 100 may execute one or more power down sequences according to the registers 102a-102n to preserve the voltage relationship as configured by the registers 102a-102n and drive the signal PWR_GOOD low). The PMIC 100 may preserve the contents of all the registers 102a-102n (e.g., including MTP error log registers). The PMIC 100 may not enter the quiescent P1 power state 388. The host 20 may re-enable the regulators 106a-106n by issuing the VR Enable command on the bus 90 (e.g., setting the register R32[7] to 1) and the PMIC 100 may execute one or more power on sequences and float the signal PWR_GOOD after the tPMIC_PWR_GOOD timing parameter is satisfied. The PMIC 100 may not require a power cycle.

The PMIC 100 may be configured to generate an internal VR Disable command at any time in response to one or more events. The PMIC 100 may execute one or more power off sequences according to the registers 102a-102n (e.g., the register R58 and the register R5A) to preserve the voltage relationship as configured in the registers 102a-102n. The PMIC 100 may not enter the quiescent P1 power state 388. The PMIC 100 may then assert the signal PWR_GOOD low. The host 20 may re-enable the regulators 106a-106n with the VR Enable command (via the signal VR_EN or the bus 90) and the PMIC 100 may float the PWR_GOOD signal. The PMIC 100 may not require a power cycle.

Figure 16:
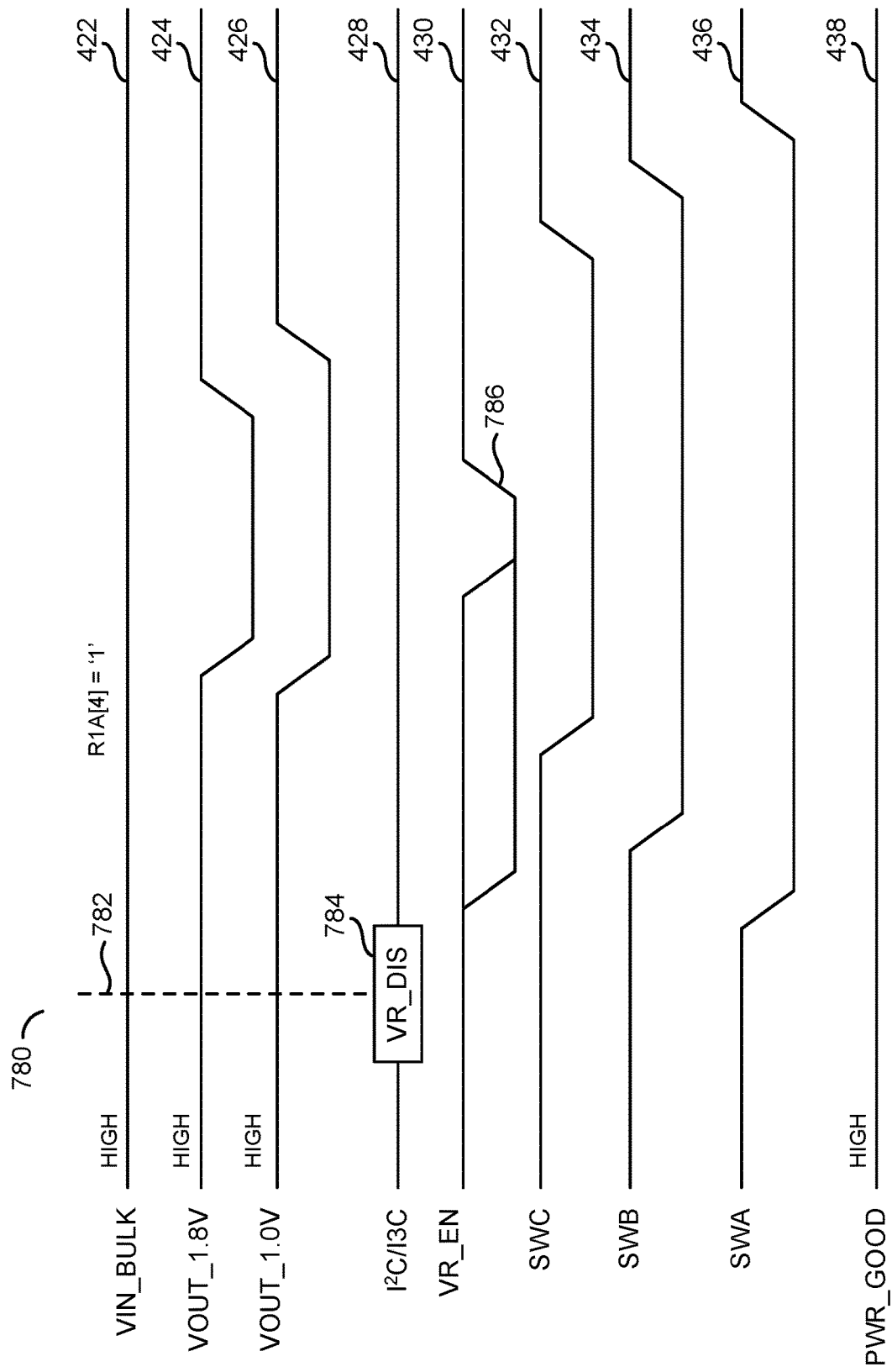
FIG. 16 is a timing diagram illustrating a power down sequence when the VR_EN pin is high with the low power state register at a low value in the secure mode of operation.

Referring to FIG. 16, a timing diagram illustrating a power down sequence when the VR_EN pin is high with the low power state register at a low value in the secure mode of operation is shown. A timing chart 780 is shown. The timing chart 780 may comprise waveforms 422-438. The waveforms 422-438 may be similar to the waveforms 422-438 shown in association with FIG. 8.

Vertical line 782 is shown. The vertical line 782 may correspond to particular timings and/or responses by the PMIC 100. The vertical line 782 may correspond to a VR Disable command generated by the host 20 on the bus 90.

The VIN_BULK waveform 422, the VOUT_1.8V waveform 424 and the VOUT_V1.0V waveform 426 may each be at a high value. The VR_EN waveform 430 may not transition before the time 782. The register value 104 may be set to 1.

Before and after the time 782 when the VR Disable command 784 is on the bus 90, the PWR_GOOD waveform 438 may remain high. After the time 782, the SWA waveform 436 may transition from high to low, then the SWB waveform 434 may transition from high to low and then the SWC waveform 432 may transition from high to low. After the SWC waveform 432 transitions from high to low, then the VOUT_1.8V waveform 424 and the VOUT_1.0V waveform 426 may transition from high to low and the VIN_BULK waveform 422 may stay high. After the time 782, the status of the VR_EN waveform 430 may have no effect.

After the time 782, the PMIC 100 may be in the quiescent P1 power state 388. A transition 786 of the VR_EN waveform 430 is shown after the time 782. The transition 786 may be the VR_EN waveform 430 changing from low to high. The PMIC 100 may exit the quiescent P1 power state when the VR_EN waveform 430 transitions from low to high. After the transition 786, the VOUT_1.8V waveform 424 may transition from low to high and then the VOUT_1.0V waveform 426 may transition from low to high. Next, the SWC waveform 432 may transition from low to high, then the SWB waveform 434 may transition from low to high and then the SWA waveform 436 may transition from low to high. The PWR_GOOD waveform 438 may remain at a static high.

Figure 17:
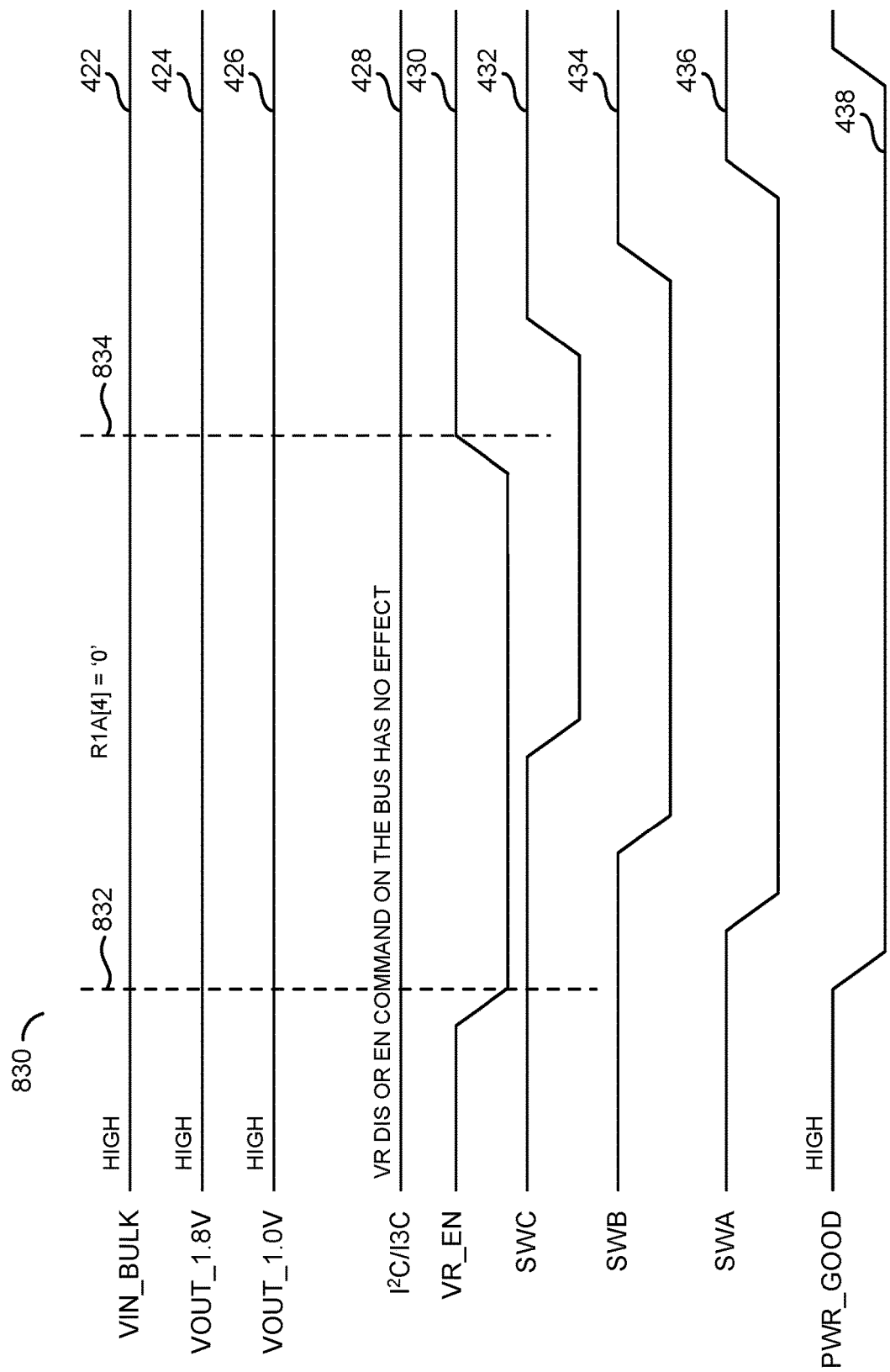
FIG. 17 is a timing diagram illustrating a disable or enable command on the bus during the secure mode of operation.

Referring to FIG. 17, a timing diagram illustrating a disable or enable command on the bus during the secure mode of operation is shown. A timing chart 830 is shown. The timing chart 830 may comprise waveforms 422-438. The waveforms 422-438 may be similar to the waveforms 422-438 shown in association with FIG. 8.

Vertical lines 832-834 are shown. The vertical lines 832-834 may correspond to particular timings and/or responses by the PMIC 100. The vertical line 832 may correspond to the transition of the VR_EN waveform 430 from high to low. The vertical line 834 may correspond to the transition of the VR_EN waveform 430 from low to high.

The VIN_BULK waveform 422, the VOUT_1.8V waveform 424 and the VOUT_V1.0V waveform 426 may each be at a high value. There may be no VR Disable command on the bus 90. The register value 104 may be set to 0.

After the time 832 when the VR_EN waveform 430 transitions to low, the PWR_GOOD waveform 438 may transition from high to low. Next, the SWA waveform 436 may transition from high to low, then the SWB waveform 434 may transition from high to low and then the SWC waveform 432 may transition from high to low. When the VR_EN waveform 430 transitions from high to low, the host 20 providing the VR Enable command or the VR Disable command on the bus 90 may have no effect on the operation of the PMIC 100.

At the time 834, the VR_EN waveform 430 may transition from low to high. After the time 834, when the VR_EN waveform 430 transitions back to high, the SWC waveform 432 may transition from low to high, then the SWB waveform 434 may transition from low to high, then the SWA waveform 436 may transition from low to high, and then the PWR_GOOD waveform 438 may transition from low to high. The VIN_BULK waveform 422, the VOUT_1.8V waveform 424 and the VOUT_V1.0V waveform 426 each remain at a high value. Regardless of how the regulators 106a-106n are turned on (e.g., using the signal VR_EN or the VR Enable command on the bus 90), the regulators 106a-106n may be powered down based on the mode of operation of the PMIC 100 (e.g., the programmable mode or the secure mode). In the secure mode of operation, when the register value 104 is set to 0, the PMIC 100 may enable the host 20 to power down any or all of the regulators 106a-106n using two different methods.

In one method, when the PMIC 100 is in the secure mode of operation and the register value 104 is set to 0, the host 20 may provide the VR Disable command by the transition of the signal VR_EN to low. The PMIC 100 may then assert the signal PWR_GOOD low. The PMIC 100 may execute one or more power down sequences according to the registers 102a-102n (e.g., the register R58 and the register R5A) to preserve the voltage relationships as configured by the registers 102a-102n. The host 20 may re-enable the output regulators 106a-106n by asserting the signal VR_EN as high. The PMIC 100 may execute one or more power on sequences according to the registers 102a-102n and float the signal PWR_GOOD after the timing parameter tPMIC_PWR_GOOD_OUT is satisfied. The PMIC 100 may not need to be power cycled. The VR Disable command or the VR Enable command on the bus 90 (e.g., the register value R32[7] set to 0 or 1) may have no effect on the PMIC 100. Configuring one or more bits (e.g., the register values R2F[6,4:3] to 0 may have no effect on the PMIC 100 (as shown in association with FIG. 18).

In another method, when the PMIC 100 is in the secure mode of operation and the register value 104 is set to 0, the regulators 106a-106n may be powered down by setting the register value R32[5] to 1, which may drive the signal PWR_GOOD to low. The PMIC 100 may perform one or more of the power down sequences according to the registers 102a-102n (e.g., the register R58 and/or the register R5A) to preserve the voltage relationships as configured in the registers 102a-102n. The PMIC 100 may drive the signal PWR_GOOD to low and unlock only the register R32. The PMIC 100 may allow the host 20 to issue the VR Enable command. The PMIC 100 may preserve the contents of all the registers 102a-102n (e.g., including MTP error log registers). In the secure mode of operation, the PMIC 100 may keep all the write protected registers locked (except for R32[7]). The host 20 may re-enable the regulators 106a-106n by issuing the VR Enable command on the bus 90 and the PMIC 100 may execute one or more power on sequences and float the signal PWR_GOOD after the tPMIC_PWR_GOOD timing parameter is satisfied. After the host 20 issues the VR Enable command, the PMIC 100 may re-lock the register R32. The PMIC 100 may not require a power cycle to re-enable the output regulators 106a-106n.

The PMIC 100 may be configured to generate an internal VR Disable command at any time in response to one or more events. The PMIC 100 may execute one or more power off sequences according to the registers 102a-102n to preserve the voltage relationship as configured in the registers 102a-102n. The PMIC 100 may then assert the signal PWR_GOOD low. In the secure mode of operation, the PMIC 100 may require a power cycle. The VR Enable command (e.g., either provided on the bus 90 or by the signal VR_EN) may have no effect on the PMIC 100 and the PMIC 100 may keep the signal PWR_GOOD low.

Figure 18:
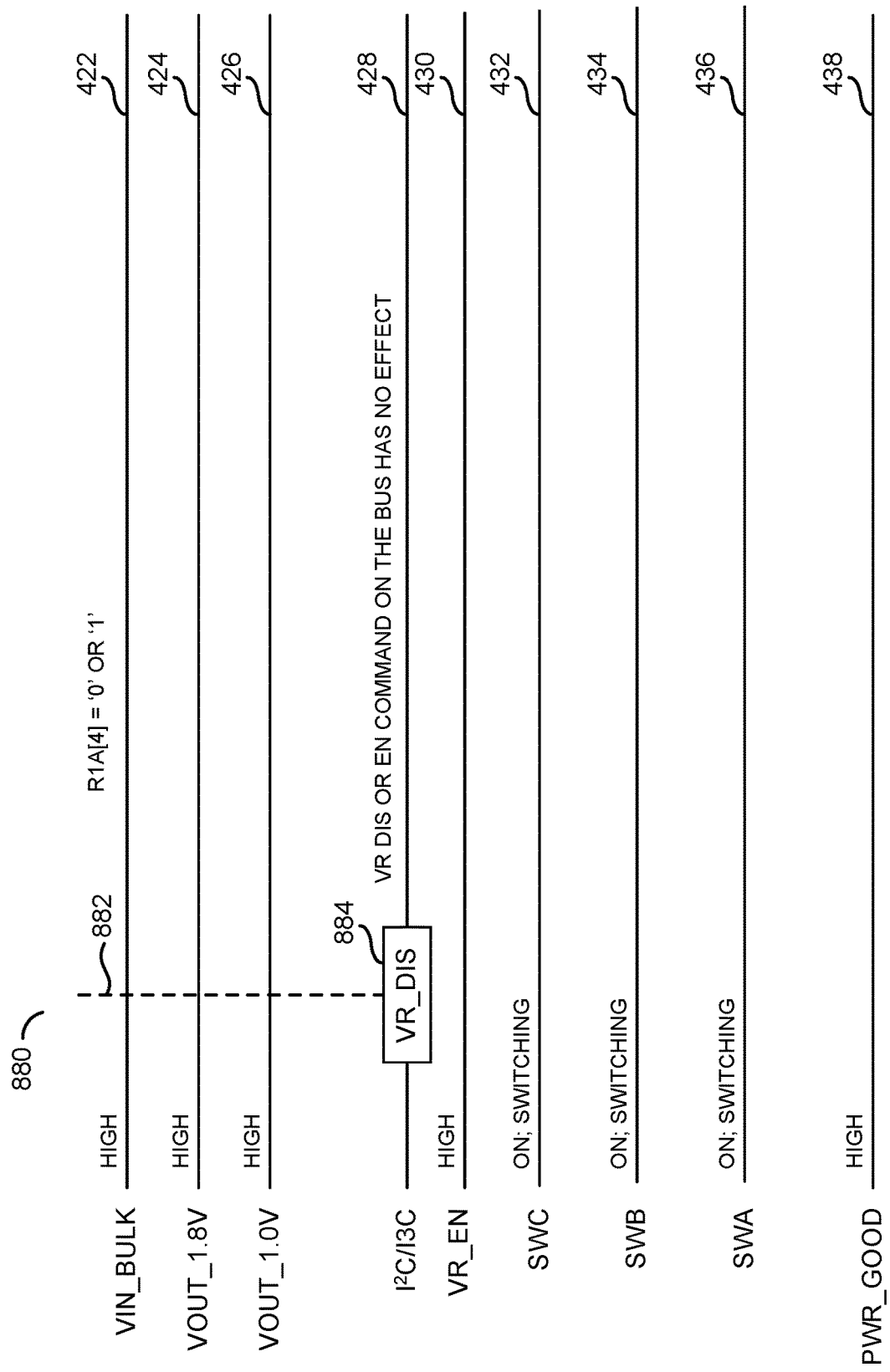
FIG. 18 is a timing diagram illustrating a power down sequence when the VR_EN pin is high with the low power state register at a high or low value in the secure mode of operation.

Referring to FIG. 18, a timing diagram illustrating a power down sequence when the VR_EN pin is high with the low power state register at a high or low value in the secure mode of operation is shown. A timing chart 880 is shown. The timing chart 880 may comprise waveforms 422-438. The waveforms 422-438 may be similar to the waveforms 422-438 shown in association with FIG. 8.

A vertical line 882 is shown. The vertical line 882 may correspond to particular timings and/or responses by the PMIC 100. The vertical line 882 may correspond to a VR Disable command on the bus 90.

The VIN_BULK waveform 422, the VOUT_1.8V waveform 424 and the VOUT_V1.0V waveform 426 may each be at a high value. The VR_EN waveform 430 may be a static high value. Since the VR_EN waveform 430 is held high, the VR Disable command 884 or a VR Enable command on the bus 90 may have no effect on the PMIC 100. The register value 104 may be set to 0 or 1. The SWC waveform 432, the SWB waveform 434 and the SWA waveform 436 may be on and switching. The signal PWR_GOOD may be held high.

Figure 19:
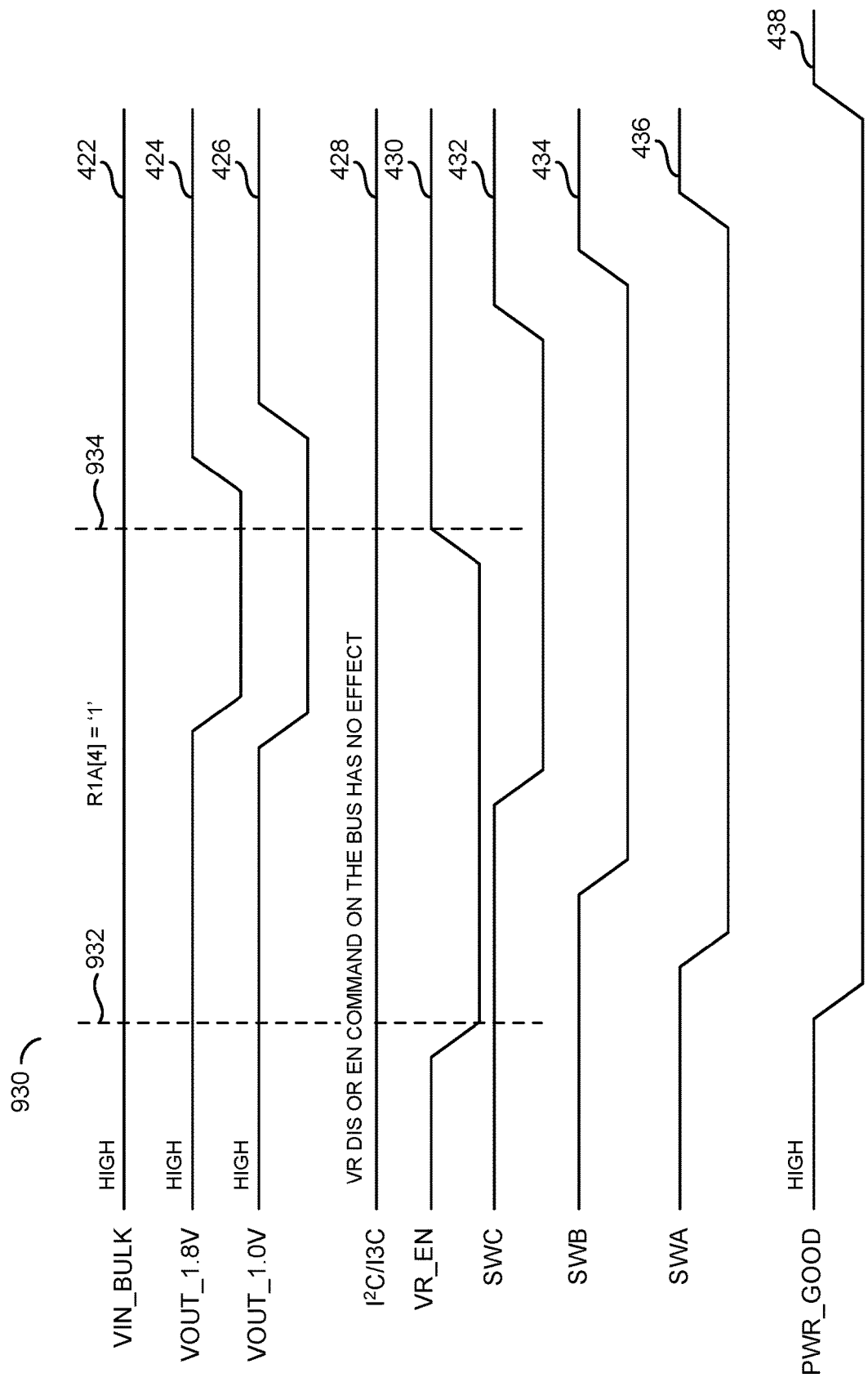
FIG. 19 is a timing diagram illustrating a power down sequence using the VR_EN pin with the low power state register at a high value in the secure mode of operation.

Referring to FIG. 19, a timing diagram illustrating a power down sequence using the VR_EN pin with the low power state register at a high value in the secure mode of operation is shown. A timing chart 930 is shown. The timing chart 930 may comprise waveforms 422-438. The waveforms 422-438 may be similar to the waveforms 422-438 shown in association with FIG. 8.

Vertical lines 932-934 are shown. The vertical lines 932-934 may correspond to particular timings and/or responses by the PMIC 100. The vertical line 932 may correspond to the transition of the VR_EN waveform 430 from high to low. The vertical line 934 may correspond to the transition of the VR_EN waveform 430 from low to high.

The VIN_BULK waveform 422, the VOUT_1.8V waveform 424 and the VOUT_V1.0V waveform 426 may each be at a high value. The SWC waveform 432, the SWB waveform 434, the SWA waveform 436 and the PWR_GOOD waveform 438 may each be at a high value. A VR Disable command or a VR Enable command on the bus 90 may have no effect. The register value 104 may be set to 1.

After the time 932 when the VR_EN waveform 430 transitions to low, the PWR_GOOD waveform 438 may transition from high to low. Next, the SWA waveform 436 may transition from high to low, then the SWB waveform 434 may transition from high to low and then the SWC waveform 432 may transition from high to low. After the SWC waveform 432 transitions to low, then the VOUT_1.8V waveform 424 and the VOUT_1.0V waveform 426 may transition from high to low.

At the time 934, the VR_EN waveform 430 may transition from low to high. After the time 934, when the VR_EN waveform 430 transitions back to high, the VOUT_1.8V waveform 424 and the VOUT_1.0V waveform 426 may transition from low to high. Next, the SWC waveform 432 may transition from low to high, then the SWB waveform 434 may transition from low to high, then the SWA waveform 436 may transition from low to high, and then the PWR_GOOD waveform 438 may transition from low to high.

Regardless of how the regulators 106a-106n are turned on (e.g., using the signal VR_EN or the VR Enable command on the bus 90), the regulators 106a-106n may be powered down based on the mode of operation of the PMIC 100 (e.g., the programmable mode or the secure mode). In the secure mode of operation, when the register value 104 is set to 1, the PMIC 100 may enable the host 20 to power down any or all of the regulators 106a-106n using two different methods.

In one method, when the PMIC 100 is in the secure mode of operation and the register value 104 is set to 1, the host 20 may provide the VR Disable command by the transition of the signal VR_EN to low. The PMIC 100 may then assert the signal PWR_GOOD low. The PMIC 100 may execute one or more power down sequences according to the registers 102a-102n (e.g., the register R58 and the register R5A) to preserve the voltage relationships as configured by the registers 102a-102n. The PMIC 100 may then enter the quiescent P1 power state 388.

The host 20 may re-enable the output regulators 106a-106n by asserting the signal VR_EN as high. The PMIC 100 may exit the quiescent P1 power state 388 and move to the idle P3 power state 386. Next, the PMIC 100 may execute one or more power on sequences according to the registers 102a-102n and float the signal PWR_GOOD after the timing parameter tPMIC_PWR_GOOD_OUT plus additional timing parameters are satisfied. The PMIC 100 may not need to be power cycled. The VR Disable command or the VR Enable command on the bus 90 (e.g., the register value R32[7] set to 0 or 1) may have no effect on the PMIC 100. Configuring one or more bits (e.g., the register values R2F[6,4:3] to 0 may have no effect on the PMIC 100 (as shown in association with FIG. 18).

In another method, when the PMIC 100 is in the secure mode of operation and the register value 104 is set to 1, the regulators 106a-106n may be powered down by setting the register value R32[5] to 1, which may drive the signal PWR_GOOD to low. The PMIC 100 may perform one or more of the power down sequences according to the registers 102a-102n (e.g., the register R58 and/or the register R5A) to preserve the voltage relationships as configured in the registers 102a-102n. The PMIC 100 may drive the signal PWR_GOOD to low and unlock only the register R32. The PMIC 100 may preserve the contents of all the registers 102a-102n (e.g., including MTP error log registers). In the secure mode of operation, the PMIC 100 may keep all the write protected registers locked (except for R32[7]). The PMIC 100 may not enter the quiescent P1 power state 388.

The host 20 may re-enable the regulators 106a-106n by issuing the VR Enable command on the bus 90 and the PMIC 100 may execute one or more power on sequences and float the signal PWR_GOOD after the tPMIC_PWR_GOOD timing parameter is satisfied. After the host 20 issues the VR Enable command, the PMIC 100 may re-lock the register R32. The PMIC 100 may not require a power cycle to re-enable the output regulators 106a-106n.

The PMIC 100 may be configured to generate an internal VR Disable command at any time in response to one or more events. The PMIC 100 may execute one or more power off sequences according to the registers 102a-102n to preserve the voltage relationship as configured in the registers 102a-102n. The PMIC 100 may not enter the quiescent P1 power state 388. The PMIC 100 may then assert the signal PWR_GOOD low. In the secure mode of operation, the PMIC 100 may require a power cycle. The VR Enable command (e.g., either provided on the bus 90 or by the signal VR_EN) may have no effect on the PMIC 100 and the PMIC 100 may keep the signal PWR_GOOD low.

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a power enable pin;
   a bus;
   an integrated circuit that comprises a power supply output, the power supply output being is configured to supply power to a component of the apparatus, the integrated circuit having a plurality of power states, the plurality of power states comprising at least a first power state in which the power supply output is disabled and a second power state in which the power supply output is enabled to supply the power to the component;
   wherein the integrated circuit is configured to independently transition from the first power state to the second power state based at least in part on a receipt of either of:
      a change in a value of a signal received via the power enable pin; and
      a command to enter the second power state by the integrated circuit via the bus, and
   wherein the plurality of power states comprises a third power state;
   the apparatus further comprises
      a register comprising a plurality of bits, a given bit of the plurality of bits corresponding to the third power state; and
      the integrated circuit is configured to transition from the second power state to the third power state based at least in part on a value of the given bit.

2. The apparatus of claim 1, wherein the integrated circuit is configured to transition from the second power state to the third power state based at least in part on the value of the given bit and a change in the value of the signal received via the power enable pin.

3. The apparatus of claim 1, wherein the integrated circuit is configured to transition from the second power state to the third power state based at least in part on the value of the given bit and a receipt of a command to enter the third power state by the integrated circuit via the bus.

4. The apparatus of claim 1, wherein the integrated circuit is configured to transition from the third power state to the second power state based at least in part on the value of the given bit and a change in the value of the signal received via the power enable pin.

5. The apparatus of claim 1, wherein the power supply output comprises a plurality of regulators, the plurality of regulators being disabled when the integrated circuit is in the first power state and being enabled when the integrated circuit is in the second power state.

6. The apparatus of claim 1, wherein:
the apparatus comprises a plurality of registers each comprising a plurality of bits, a given bit of a given register of the plurality of registers corresponding to a secure mode of operation of the integrated circuit; and
the integrated circuit is configured to operate in the secure mode of operation based at least in part on a value of the given bit, the secure mode of operation being configured to inhibit modification of at least some of the plurality of registers.

7. The apparatus of claim 6, wherein, when operating in the secure mode of operation, the integrated circuit is configured to:
allow modification of the plurality of registers during a power up operation prior to receipt of a power enable command, the integrated circuit being configured to enable the power supply output to supply power to the component of the apparatus based at least in part on the power enable command; and
inhibit modification of at least some of the plurality of registers after receipt of the power enable command.

8. The apparatus of claim 7, wherein the power enable command comprises one of:
the change in the value of the signal received via the power enable pin; and
the receipt of the command to enter the second power state by the integrated circuit via the bus.

9. An apparatus comprising:
a power enable pin;
an integrated circuit that comprises a power supply output, the power supply output being is configured to supply power to a component of the apparatus, the integrated circuit having a plurality of power states, the plurality of power states comprising at least a first power state in which the power supply output is disabled and a second power state in which the power supply output is enabled to supply the power to the component; and
a register comprising a plurality of bits, a given bit of the plurality of bits corresponding to the first power state,
the register comprises a plurality of registers each comprising a plurality of bits, a given register of the plurality of registers comprising a bit that corresponds to a secure mode of operation of the integrated circuit; and
the integrated circuit is configured to operate in the secure mode of operation based at least in part on a value of the corresponding bit of the given register, the secure mode of operation being configured to inhibit modification of at least some of the plurality of registers;
wherein the integrated circuit is configured to transition from the first power state to the second power state based at least in part on:
a receipt of a change in a value of a signal received via the power enable pin; and
a value of the given bit.

10. The apparatus of claim 9, wherein the integrated circuit is configured to transition from the second power state to the first power state based at least in part on the value of the given bit and a change in the value of the signal received via the power enable pin.

11. The apparatus of claim 9, wherein the power supply output comprises a plurality of regulators, the plurality of regulators being disabled when the integrated circuit is in the first power state and being enabled when the integrated circuit is in the second power state.

12. The apparatus of claim 9, wherein:
the apparatus further comprises a bus; and
the integrated circuit is configured to transition from the second power state to the first power state based at least in part on the value of the given bit and a receipt of a command to enter the first power state by the integrated circuit via the bus.

13. The apparatus of claim 9, wherein, when operating in the secure mode of operation, the integrated circuit is configured to:
allow modification of the plurality of registers during a power up operation prior to receipt of a power enable command, the integrated circuit being configured to enable the power supply output to supply power to the component of the apparatus based at least in part on the power enable command; and
inhibit modification of at least some of the plurality of registers after receipt of the power enable command.

14. The apparatus of claim 13, wherein the power enable command comprises one of:
a change in the value of a signal received via the power enable pin; and
a receipt of a command to enter the second power state by the integrated circuit via a bus.

15. An apparatus comprising:
an integrated circuit comprising a plurality of power supply outputs, the plurality of power supply outputs being configured to supply power to components of the apparatus; and
a plurality of registers each comprising a plurality of bits, a given bit of a given register of the plurality of registers corresponding to a secure mode of operation of the integrated circuit;
wherein the integrated circuit is configured to operate in the secure mode of operation based at least in part on a value of the given bit; and
wherein, when operating in the secure mode of operation, the integrated circuit is configured to:
allow modification of the plurality of registers during a power up operation prior to receipt of a power enable command, the integrated circuit being configured to enable the plurality of power supply outputs to supply power to the components of the apparatus based at least in part on the power enable command; and
inhibit modification of at least some of the plurality of registers after receipt of the power enable command.

16. The apparatus of claim 15, wherein:
the apparatus further comprises:
a power enable pin; and
a bus;
the integrated circuit comprises a plurality of power states, the plurality of power states comprising at least a first power state in which the power supply outputs are disabled and a second power state in which the power supply outputs are enabled to supply the power to the components; and
the integrated circuit is configured to independently transition from the first power state to the second power state based at least in part on a receipt of the power enable command.

17. The apparatus of claim 16, wherein the power enable command comprises either of:
a change in a value of a signal received via the power enable pin; and
a receipt of a command to enter the second power state by the integrated circuit via the bus.

18. The apparatus of claim 17, wherein:
the plurality of power states comprises a third power state;
a second register of the plurality of registers comprising a bit that corresponds to the third power state;
the integrated circuit is configured to transition from the second power state to the third power state based at least in part on a value of the bit corresponding to the third power state and a change in the value of the signal received via the power enable pin;
the integrated circuit is configured to transition from the second power state to the third power state based at least in part on a value of the bit corresponding to the third power state and a change in the value of the signal received via the power enable pin;
the integrated circuit is configured to transition from the second power state to the third the integrated circuit is configured to transition from the second power state to the third power state based at least in part on a value of the bit corresponding to the third power state and a change in the value of the signal received via the power enable pin;
the integrated circuit is configured to transition from the second power state to the third the integrated circuit is configured to transition from the second power state to the third power state based at least in part on the value of the bit corresponding to the third power state and a receipt of a command to enter the third power state by the integrated circuit via the bus; and
the integrated circuit is configured to transition from the third power state to the second power state based at least in part on the value of the bit corresponding to the third power state and a change in the value of the signal received via the power enable pin.

* * * * *